United States Patent
Gallinghouse et al.

(10) Patent No.: US 10,635,820 B1
(45) Date of Patent: Apr. 28, 2020

(54) UPDATE POLICY-BASED ANTI-ROLLBACK TECHNIQUES

(71) Applicant: Square, Inc., San Francisco, CA (US)

(72) Inventors: Davis Gallinghouse, New York, NY (US); John Kelley, San Francisco, CA (US); Todor Ristov, San Bruno, CA (US); Rodion Steshenko, San Francisco, CA (US); Nicholas Hebner, San Francisco, CA (US); Max Joseph Guise, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 134 days.

(21) Appl. No.: 15/721,663

(22) Filed: Sep. 29, 2017

(51) Int. Cl.
    *G06F 21/57*     (2013.01)
    *H04L 9/30*     (2006.01)
    *G06F 9/4401*     (2018.01)

(52) U.S. Cl.
    CPC .......... *G06F 21/575* (2013.01); *G06F 9/4416* (2013.01); *H04L 9/30* (2013.01)

(58) Field of Classification Search
    CPC .. G06F 8/65; G06F 8/71; G06Q 20/20; G06Q 20/206; G06Q 20/34; G06Q 20/3829; G06Q 2220/00
    See application file for complete search history.

(56) References Cited

U.S. PATENT DOCUMENTS

| | | |
|---|---|---|
| 3,128,349 A | 4/1964 | Boesch et al. |
| 4,776,003 A | 10/1988 | Harris |
| 4,860,336 A | 8/1989 | D'Avello et al. |
| 5,221,838 A | 6/1993 | Gutman et al. |

(Continued)

FOREIGN PATENT DOCUMENTS

| | | |
|---|---|---|
| AU | 2324402 A | 6/2002 |
| CN | 109314545 A | 2/2019 |

(Continued)

OTHER PUBLICATIONS

Brinkmann, M., "Windows 10 Update Delivery Optimization explained," Windows, dated Aug. 17, 2016, Retrieved from the Internet URL: https://web.archive.org/web/20161110094241/https://www.ghacks.net/2016/08/17/windows-10-update-delivery-optimization/, pp. 1-6.

(Continued)

*Primary Examiner* — Abiy Getachew
(74) *Attorney, Agent, or Firm* — Lee & Hayes, P.C.

(57) ABSTRACT

Techniques for implementing policy-based anti-rollback techniques on a computing device are described herein. As an example, a remote service may provide the computing device with a boot policy which indicates, for each boot stage of a software bootloader process, what software versions are permitted to execute. Prior to providing the computing device with the boot policy, the remote service may sign the boot policy with a private key, and include of an identifier corresponding to the computing device. At each boot stage of the bootloader process, components of the computing device may verify, using a public key, that the boot policy was signed with the private key, and that the boot policy corresponds to the computing device. After verification, the components may analyze the boot policy to determine whether each boot stage is permitted to execute a software version and boot to the next boot stage.

20 Claims, 7 Drawing Sheets

(56) References Cited

U.S. PATENT DOCUMENTS

| | | | |
|---|---|---|---|
| 5,351,296 A | 9/1994 | Sullivan | |
| 5,388,155 A | 2/1995 | Smith | |
| 5,408,513 A | 4/1995 | Busch, Jr. et al. | |
| 5,714,741 A | 2/1998 | Pieterse et al. | |
| 5,729,591 A | 3/1998 | Bailey | |
| 5,740,232 A | 4/1998 | Pailles et al. | |
| 5,838,773 A | 11/1998 | Eisner et al. | |
| 5,850,599 A | 12/1998 | Seiderman | |
| 5,867,795 A | 2/1999 | Novis et al. | |
| 5,940,510 A | 8/1999 | Curry et al. | |
| 6,010,067 A | 1/2000 | Elbaum | |
| 6,098,881 A | 8/2000 | Deland, Jr. et al. | |
| 6,144,336 A | 11/2000 | Preston et al. | |
| 6,234,389 B1 | 5/2001 | Valliani et al. | |
| 6,278,779 B1 | 8/2001 | Bryant et al. | |
| 6,360,362 B1* | 3/2002 | Fichtner | G06F 8/65 713/100 |
| 6,481,623 B1 | 11/2002 | Grant et al. | |
| 6,886,742 B2 | 5/2005 | Stoutenburg et al. | |
| 6,990,683 B2 | 1/2006 | Itabashi | |
| 7,003,316 B1 | 2/2006 | Elias et al. | |
| 7,066,382 B2 | 6/2006 | Kaplan | |
| 7,083,090 B2 | 8/2006 | Zuili | |
| 7,163,148 B2 | 1/2007 | Durbin et al. | |
| 7,210,627 B2 | 5/2007 | Morley et al. | |
| 7,363,054 B2 | 4/2008 | Elias et al. | |
| 7,424,732 B2 | 9/2008 | Matsumoto et al. | |
| 7,433,452 B2 | 10/2008 | Taylor et al. | |
| 7,591,425 B1 | 9/2009 | Zuili et al. | |
| 7,673,799 B2 | 3/2010 | Hart et al. | |
| 7,810,729 B2 | 10/2010 | Morley, Jr. | |
| 7,896,248 B2 | 3/2011 | Morley, Jr. | |
| 8,086,531 B2 | 12/2011 | Litster et al. | |
| 8,126,734 B2 | 2/2012 | Dicks et al. | |
| 8,265,553 B2 | 9/2012 | Cheon et al. | |
| 8,397,988 B1 | 3/2013 | Zuili | |
| 8,498,213 B2 | 7/2013 | Gnanasekaran et al. | |
| 8,542,583 B2 | 9/2013 | Gnanasekaran et al. | |
| 8,588,075 B2 | 11/2013 | Gnanasekaran et al. | |
| 8,593,965 B2 | 11/2013 | Rongong et al. | |
| 8,599,691 B2 | 12/2013 | Gnanasekaran et al. | |
| 8,767,561 B2 | 7/2014 | Gnanasekaran et al. | |
| 8,792,354 B2 | 7/2014 | Gnanasekaran et al. | |
| 8,797,877 B1 | 8/2014 | Perla et al. | |
| 9,020,853 B2 | 4/2015 | Hoffman et al. | |
| 9,264,889 B2 | 2/2016 | Choi-Grogan et al. | |
| 9,268,555 B2 | 2/2016 | Djabarov et al. | |
| 9,411,574 B2 | 8/2016 | Kostadinov et al. | |
| 9,489,496 B2 | 11/2016 | Wysocki et al. | |
| 9,608,909 B1 | 3/2017 | Bharadwaj et al. | |
| 9,679,286 B2 | 6/2017 | Colnot et al. | |
| 9,830,141 B2 | 11/2017 | Cairns et al. | |
| 9,916,737 B2 | 3/2018 | Osmon et al. | |
| 9,934,014 B2 | 4/2018 | Diebolt et al. | |
| 10,050,347 B2 | 8/2018 | Wei | |
| 2002/0091633 A1 | 7/2002 | Proctor | |
| 2002/0153414 A1 | 10/2002 | Stoutenburg et al. | |
| 2003/0076263 A1 | 4/2003 | Hassan-Zade et al. | |
| 2003/0135418 A1 | 7/2003 | Shekhar et al. | |
| 2003/0154414 A1 | 8/2003 | von Mueller et al. | |
| 2003/0183691 A1 | 10/2003 | Lahteenmaki et al. | |
| 2004/0012875 A1 | 1/2004 | Wood | |
| 2004/0041911 A1 | 3/2004 | Odagiri et al. | |
| 2004/0059682 A1 | 3/2004 | Hasumi et al. | |
| 2004/0159699 A1* | 8/2004 | Nelson | G06Q 20/20 235/379 |
| 2004/0167820 A1 | 8/2004 | Melick et al. | |
| 2004/0204082 A1 | 10/2004 | Abeyta | |
| 2005/0097015 A1 | 5/2005 | Wilkes et al. | |
| 2005/0108444 A1 | 5/2005 | Flauaus et al. | |
| 2005/0109841 A1 | 5/2005 | Ryan et al. | |
| 2005/0236480 A1 | 10/2005 | Vrotsos et al. | |
| 2006/0032905 A1 | 2/2006 | Bear et al. | |
| 2006/0049255 A1 | 3/2006 | von Mueller et al. | |
| 2006/0190611 A1 | 8/2006 | Miyazaki et al. | |
| 2006/0223580 A1 | 10/2006 | Antonio et al. | |
| 2007/0051809 A1 | 3/2007 | Takahashi et al. | |
| 2007/0067833 A1 | 3/2007 | Colnot | |
| 2007/0121507 A1 | 5/2007 | Manzalini et al. | |
| 2007/0168300 A1 | 7/2007 | Quesselaire et al. | |
| 2007/0194104 A1 | 8/2007 | Fukuda et al. | |
| 2007/0198436 A1 | 8/2007 | Weiss | |
| 2008/0091617 A1 | 4/2008 | Hazel et al. | |
| 2009/0070583 A1 | 3/2009 | von Mueller et al. | |
| 2009/0112768 A1 | 4/2009 | Hammad et al. | |
| 2009/0164326 A1 | 6/2009 | Bishop et al. | |
| 2010/0057620 A1 | 3/2010 | Li et al. | |
| 2010/0243732 A1 | 9/2010 | Wallner | |
| 2011/0110232 A1 | 5/2011 | Abraham et al. | |
| 2011/0110381 A1 | 5/2011 | Atkinson et al. | |
| 2012/0094599 A1 | 4/2012 | Takeyama | |
| 2013/0260680 A1 | 10/2013 | Tsai | |
| 2013/0309966 A1 | 11/2013 | Aldana et al. | |
| 2013/0343186 A1 | 12/2013 | Gnanasekaran et al. | |
| 2014/0056147 A1 | 2/2014 | Gnanasekaran et al. | |
| 2014/0086054 A1 | 3/2014 | Rongong et al. | |
| 2014/0148095 A1 | 5/2014 | Smith et al. | |
| 2014/0150056 A1 | 5/2014 | Williams et al. | |
| 2014/0317614 A1* | 10/2014 | Djabarov | G06F 8/654 717/173 |
| 2014/0375481 A1 | 12/2014 | McNicoll | |
| 2015/0048163 A1 | 2/2015 | Senior | |
| 2015/0052512 A1 | 2/2015 | Kostadinov et al. | |
| 2015/0178064 A1 | 6/2015 | Cairns et al. | |
| 2015/0235204 A1 | 8/2015 | Wallner | |
| 2015/0303994 A1 | 10/2015 | Dhayni | |
| 2015/0339649 A1 | 11/2015 | Pi Farias | |
| 2016/0006123 A1 | 1/2016 | Li et al. | |
| 2016/0054989 A1* | 2/2016 | Diebolt | G06F 8/61 717/177 |
| 2016/0111770 A1 | 4/2016 | Choi et al. | |
| 2016/0182127 A1 | 6/2016 | Karandikar et al. | |
| 2016/0218432 A1 | 7/2016 | Pope et al. | |
| 2016/0275478 A1 | 9/2016 | Li et al. | |
| 2016/0306616 A1 | 10/2016 | Tomppo | |
| 2016/0323428 A1 | 11/2016 | Kim et al. | |
| 2017/0357961 A1 | 12/2017 | Bidari et al. | |
| 2018/0005224 A1 | 1/2018 | Binder et al. | |
| 2018/0063004 A1 | 3/2018 | Uppunda et al. | |
| 2018/0068300 A1 | 3/2018 | Saeed et al. | |
| 2019/0004785 A1 | 1/2019 | Kelley et al. | |

FOREIGN PATENT DOCUMENTS

| | | |
|---|---|---|
| CN | 109644021 A | 4/2019 |
| DE | 20320080 U1 | 4/2004 |
| EP | 0 895 203 A2 | 2/1999 |
| EP | 1260947 A1 | 11/2002 |
| EP | 1 874 014 A2 | 1/2008 |
| FR | 2 812 744 A1 | 2/2002 |
| FR | 2 812 745 A1 | 2/2002 |
| FR | 2 834 156 A1 | 6/2003 |
| JP | H09231285 A | 9/1997 |
| JP | 2000-030146 A | 1/2000 |
| JP | 2000-276539 A | 10/2000 |
| JP | 2001-222595 A | 8/2001 |
| JP | 2002-074507 A | 3/2002 |
| JP | 2002-123771 A | 4/2002 |
| JP | 2002-279320 A | 9/2002 |
| JP | 2002-352166 A | 12/2002 |
| JP | 2002-358285 A | 12/2002 |
| JP | 2003-108777 A | 4/2003 |
| JP | 2003-281453 A | 10/2003 |
| JP | 2003-308438 A | 10/2003 |
| JP | 2004-054651 A | 2/2004 |
| JP | 2004-062733 A | 2/2004 |
| JP | 2004-078553 A | 3/2004 |
| JP | 2004-078662 A | 3/2004 |
| JP | 2004-199405 A | 7/2004 |
| JP | 4248820 B2 | 4/2009 |
| KR | 10-1999-0066397 A | 8/1999 |
| KR | 10-1999-0068618 A | 9/1999 |
| KR | 200225019 B1 | 3/2001 |
| KR | 10-2003-0005936 A | 1/2003 |

(56) References Cited

FOREIGN PATENT DOCUMENTS

| KR | 10-2003-0005984 A | 1/2003 |
|---|---|---|
| KR | 10-2003-0012910 A | 2/2003 |
| KR | 200333809 B1 | 11/2003 |
| KR | 10-2004-0016548 A | 2/2004 |
| KR | 100447431 B1 | 8/2004 |
| KR | 200405877 B1 | 1/2006 |
| KR | 100649151 B1 | 11/2006 |
| KR | 10-2007-0107990 A | 11/2007 |
| KR | 100842484 B1 | 6/2008 |
| RU | 2284578 C1 | 9/2006 |
| WO | 1998/012674 A2 | 3/1998 |
| WO | 2000/011624 A1 | 3/2000 |
| WO | 2000/025277 A1 | 5/2000 |
| WO | 2001/086599 A2 | 11/2001 |
| WO | 2002/033669 A1 | 4/2002 |
| WO | 2002/043020 A2 | 5/2002 |
| WO | 2002/082388 A1 | 10/2002 |
| WO | 2002/084548 A1 | 10/2002 |
| WO | 2003/044710 A1 | 5/2003 |
| WO | 2003/079259 A1 | 9/2003 |
| WO | 2004/023366 A1 | 3/2004 |
| WO | 2006/131708 A1 | 12/2006 |
| WO | 2017/214349 A1 | 12/2017 |
| WO | 2018/005468 A1 | 1/2018 |
| WO | 2019/005386 A1 | 1/2019 |

OTHER PUBLICATIONS

"FLEX-M24LR04E 45 mm×75 mm flexible antenna reference board for the M24LR04E-R Dual Interface EEPROM," St Microelectronics, published Jul. 2, 2012, Retrieved from the Internet URL : http://www.st.com/content/ccc/resource/technical/document/data_brief/2d/55/62/05/58/fd/42/e2/DM00058583.pdf/files/DM00058583.pdf/jcr:content/translations/en.DM00058583.pdf, on Sep. 26, 2017, pp. 1-3.
Negron, J., "[Technical Blueprint] Windows 10 Co-Management with SCCM & Workspace ONE," VMware End-User Computing Blog, dated Apr. 16, 2018, Retrieved from the Internet URL: http://aponewsletter.blogspot.com/2018/04/technical-blueprint-windows-10-co.html, pp. 1-9.
"Software Update Server," Technology Brief, Retrieved from the Internet URL: https://www.apple.com/server/docs/Software_Update_Server_TB_v10.4.pdf, pp. 1-3 (Jun. 16, 2005).
Non-Final Office Action dated Mar. 29, 2018, for U.S. Appl. No. 15/248,071, of Uppunda, K.K.K., et al., filed Aug. 26, 2016.
Non-Final Office Action dated Apr. 19, 2018, for U.S. Appl. No. 15/176,589, of Bidari, E., et al., filed Jun. 8, 2016.
Non-Final Office Action dated Jul. 25, 2018, for U.S. Appl. No. 15/636,356, of Kelley, J., et al., filed Jun. 28, 2017.
International Search Report and Written Opinion for International Application No. PCT/US2016/050036, dated Nov. 29, 2016.
International Search Report and Written Opinion for International Application No. PCT/US2017/039466, dated Oct. 5, 2017.
International Search Report and Written Opinion for International Application No. PCT/US2017/036473, dated Oct. 13, 2017.
International Search Report and Written Opinion for International Application No. PCT/US2018/034773, dated Aug. 10, 2018.
Final Office Action dated Oct. 25, 2018, for U.S. Appl. No. 15/176,589, of of Bidari, F, et al., filed Jun. 8, 2016.
Final Office Action dated Nov. 5, 2018, for U.S. Appl. No. 15/248,071, of Uppunda, K.K.K., et al., filed Aug. 26, 2016.
Final Office Action dated Jan. 4, 2019, for U.S. Appl. No. 15/636,356, of Kelley, J., et al., filed Jun. 28, 2017.
Advisory Action dated Jan. 7, 2019, for U.S. Appl. No. 15/176,589, of Bidari, E., et al., filed Jun. 8, 2016.
Notice of Allowance dated Jan. 18, 2019, for U.S. Appl. No. 15/197,720, of Binder, J., et al., filed Jun. 29, 2016.
Non-Final Office Action dated Mar. 14, 2019 for U.S. Appl. No. 15/636,356, of Kelley, J. filed Jun. 28, 2017.
Non-Final Office Action dated Mar. 25, 2019, for U.S. Appl. No. 15/248,071, of Uppunda, K.K.K., et al., filed Aug. 26, 2016.
Non-Final Office Action dated Jun. 24, 2019, for U.S. Appl. No. 16/397,836, of Binder, J., et al., filed Apr. 29, 2019.
Non-Final Office Action dated Jun. 28, 2019, for U.S. Appl. No. 15/176,589, of Bidari, E., et al., filed Jun. 8, 2016.
Non-Final Office Action dated Jul. 15, 2019, for U.S. Appl. No. 15/636,356, of Kelley, J., et al., filed Jun. 28, 2017.
"Connection of Terminal Equipment to the Telephone Network," FCC 47 CFR Part 68, Retrieved from the URL: http://www.tscm.com/FCC47CFRpart68.pdf, on Sep. 24, 2019 Oct. 1, 1999 Edition.
"Embedded FINancial transactional IC card READer," Retrieved from the URL: https://cordis.europa.eu/project/rcn/58338/factsheet/en.
Geethapriya Venkataramani and Srividya Gopalan., "Mobile phone based RFID architecture for secure electronic payments using RFID credit cards," 2007 IEEE, (ARES'07).
"Guideline for the Use of Advanced Authentication Technology," FIPS 190, Sep. 28, 1994.
"Identification cards—Recording technique—Part 4—Location of read-only magnetic tracks—Track 1 and 2," ISO/IEC 7811-4:1995, International Organization for Standardization, Aug. 1995.
Jerome Svigals., "The Long Life and Imminent Death of the Mag-stripe Card," IEEE Spectrum, vol. 49, Issue 61, Jun. 2012.
"Magensa's Decryption Services and MagTek's MagneSafe™ Bluetooth Readers Selected by eProcessing Network to Implement Secure Customer Card Data with Mobile Devices," Retrieved from the URL: https://www.magnensa.net/aboutus/articles/eProcessing—rev1.pdf Apr. 14, 2008.
Martha E. Haykin et al., "Smart Card Technology: New Methods for Computer Access Control," NIST Special Publication 500-157, Sep. 1988.
"MSP430x1xx Family User's Guide," (including 2016 correction sheet at 2), Texas Instruments Inc., 2006.
Spegele, Joseph Brain., "A Framework for Evaluating Application of Smart Cards and Related Technology Within the Department of Defense," Naval Postgraduate School, Jan. 1995.
Stephen A. Sherman et al., "Secure Network Access Using Multiple Applications of AT&T's Smart Card," AT&T Technical Journal, Sep./Oct. 1994.

* cited by examiner

UPDATE POLICY-BASED ANTI-ROLLBACK TECHNIQUES

BACKGROUND

With the continued proliferation of technology in the daily activities of our society, private user information is commonly input to computing devices, and communicated over networks by these computing devices. For example, merchants commonly install software provided by payment processing services on point-of-sale computing devices to perform transactions with customers using electronic payment instruments. While these types of technological advances greatly increase user satisfaction by allowing transactions with merchants using electronic payment instruments, and increase profits for merchants by receiving payments from users who do not commonly carry non-electronic payment means, there are often security issues with computing devices handling private user information. For example, untrustworthy entities such as hackers may attempt to install versions of software with known security vulnerabilities onto point-of-sale computing devices in order to obtain private information by exposing the known security vulnerabilities. Thus, computing devices which obtain or store private information are vulnerable to attack by hackers who install versions of software with known vulnerabilities.

BRIEF DESCRIPTION OF THE DRAWINGS

The above and other features of the present disclosure, its nature and various advantages, will be more apparent upon consideration of the following detailed description, taken in conjunction with the accompanying drawings in which.

Figure 1:
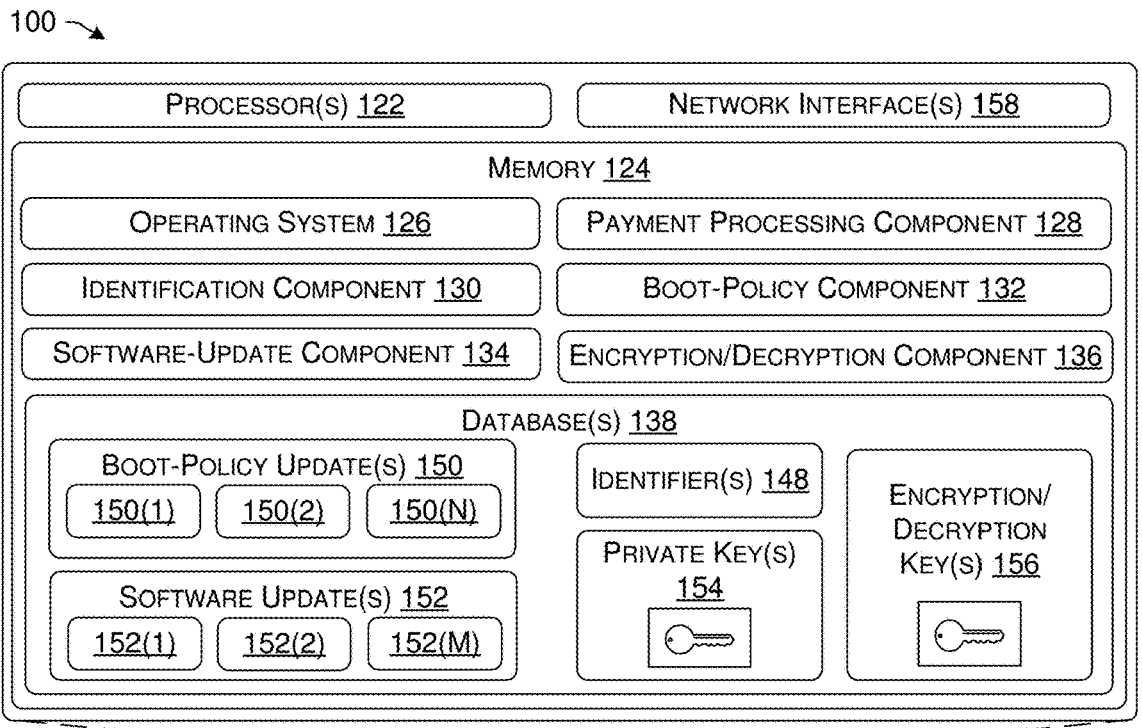
FIG. 1 depicts an example environment of a payment service providing a merchant device with a signed boot policy.
Figure 1:
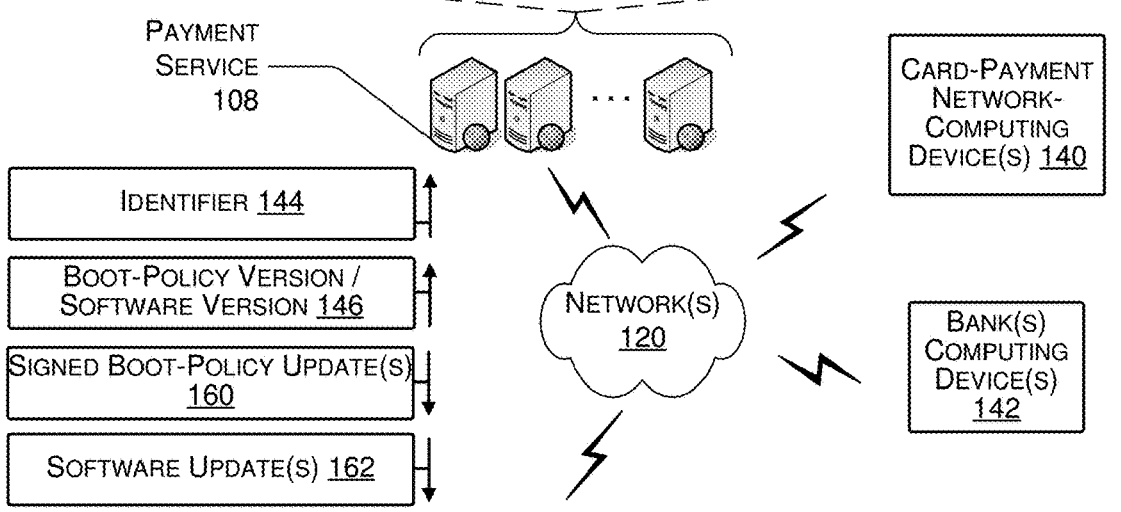
Figure 1:
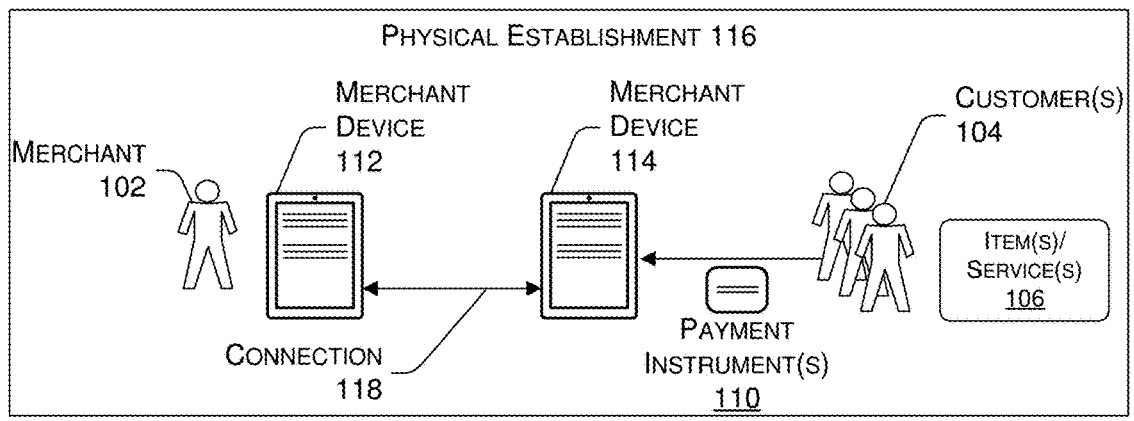

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

The techniques and systems described herein are directed to implementing policy-based anti-rollback techniques on a computing device for preventing malicious entities from installing, and exposing, software with known security vulnerabilities to obtain information stored on the computing device. Some types of anti-rollback techniques may include the use of hardware-based fuses which may be used to prevent certain types of software or versions of software from being installed and/or executed on a computing device. However, once a fuse is "burnt" (e.g., a one-time pad (OTP) bit is flipped) due to an improper installation/execution of a disallowed type or version of software, the fuse is no longer usable. A burnt fuse may prevent use of that type or version of software on that computing device for all future use, which restricts rolling back of permissible software versions. Additionally, chipsets have limited amounts of hardware-based fuses due to limited space on the chipset. Thus, hardware-based fuses may result in devices becoming unsafe or unusable once all the fuses are burnt, and may further prevent flexibility in allowing certain types or versions of software from being installed. Accordingly, additional flexibility may be desired for computing devices implementing anti-rollback techniques.

The policy-based anti-rollback techniques described herein include the use of software-based policies which define which types and/or versions of software are permitted to be installed and/or executed on a computing device. Software anti-rollback, or software downgrade prevention, may be part of one or more verifications performed during a secure boot process. Anti-rollback may comprise a technique or mechanism to prevent an older, or otherwise vulnerable, type or version of a software component from being installed and executed on a computing device which is running a secure version of the software.

In some examples, the software-based policies discussed herein may define what versions of software are permitted to be installed and executed on a computing device. For instance, an anti-rollback table may be stored at a computing device in non-volatile memory, such as in embedded MultiMediaCard (eMMC) memory. In some examples, the software-based policies may comprise boot policies which indicate which versions of software that one or more boot stages in a bootloader process are permitted to be executed by the computing device. For instance, the boot policy may simply indicate a version of the software that a first boot stage is permitted to execute, or versions of software that each boot stage in the boot process are allowed or permitted to execute. In some examples, as the boot process for the software is executed (e.g., bootloader for an operation system (OS), bootloader for an application, etc.), every boot stage of the bootloader may include a boot reader which analyzes the boot policy to determine whether a version of the software attempting to be booted or executed is permitted on the computing device.

In some examples, the boot policies stored at the computing devices may be encrypted and/or signed using various types of keys. For example, the anti-rollback techniques described herein may be implemented by a merchant point-of-sale (POS) device which receives payment data from payment instruments of customers, and sends the payment data to a remote, secure and remote cloud-based system, such as a payment service (e.g., payment system). One or more entities who own and/or operate the payment service may perform transactions on behalf of the merchants who own merchant devices, and may further issue software which executes on the merchant devices. In some examples, the payment service may manage, create, and issue the boot policies to the merchant devices for merchants who subscribe to their payment processing services. To ensure that merchants or other entities with access to merchant devices subscribed to the payment processing service do not attempt to install older or otherwise vulnerable versions of software, the payment service may sign each of the boot policies with a private key stored locally at the cloud-based payment service. In this way, only boot policies that have a valid public key usable to verify a signature made with the private key are able to access the boot policy and execute software on the merchant device.

In addition to signing each of the boot policies with a private key, the payment service may further include in the boot policy, or in the signature made with the private key, an identifier associated with the respective merchant device (e.g., device serial number, device IP address, etc.). In this way, in some instances the chipset executing the software is only able to execute software on a merchant device using a boot policy that has a specific identifier, or serial number, corresponding to that merchant device (e.g., cannot use a less restrictive boot policy for a different device). In some examples, groupings of merchant devices may be created based on various characteristics of the merchant devices, such as being grouped based on ownership by a common merchant, being grouped based on a common device type, etc. In this way, the payment service may define boot policies for groupings of merchant devices, and issue the unique boot policies to the groupings of merchant devices. For instance, a particular merchant may request that certain versions of software and/or applications are executable on the merchant devices for compatibility reasons with other software and/or hardware of the merchant devices, and the boot policies for each merchant device of that merchant may be uniquely tailored for the merchant. Further, the boot policies may be updated as requests of merchants change in time, whereas hardware-based fuses are unable to be changed at all, or at least not with such as much ease as issuing an updated software-based boot policy over networks to merchant devices.

In some examples, the payment service may determine that a merchant device requires an updated boot policy. For instance, the payment service may periodically send out updated boot policies to merchant devices responsive to generating or otherwise receiving the updated boot policy. In some examples, the payment service may determine that the merchant device requires an updated boot policy by receiving an indicating that a version of software was unable to boot on the device. In various instances, the payment service may receive a request from a merchant device to process a transaction on behalf of the merchant device, where the request includes an identifier for the merchant device. The payment service may use the identifier to identify the merchant device, and query a database storing information about the merchant device to determine that the merchant device requires an updated boot policy. In further examples, the boot policies may be associated with expiration dates at which the boot policies will no longer allow execution of software on the merchant devices. Thus, the payment service may receive an indication that a boot policy has expired on a merchant device, or otherwise determine that the boot policy has expired based on its issue date, and issue an updated boot policy to the merchant device. In further examples, the payment service may receive a request to register a new merchant device with an account of a merchant, and determine to issue an updated or new boot policy to the new merchant device Upon determining that a merchant device requires, or has requested, an updated boot policy, the payment service may issue a boot policy to the merchant device once the boot policy has been signed with the private key. As part of signing the boot policy with the private key, the payment service may further include, either in the boot policy or as part of the signature, the identifier for the corresponding merchant device on which the boot policy is to be stored and implemented. The payment service may further encrypt the data of the boot policy prior to transmitting the boot policy using encryption keys stored at the payment service.

The merchant devices may receive, from the payment service, a signed boot policy that has been signed using the private key of the payment service. The merchant devices may then store and/or replace an existing boot policy at the merchant device in storage of the merchant device. In some examples, once the signed boot policy is stored in storage of the merchant device, a component executing on a processor of the merchant device may force a reboot the merchant device, and load the signed boot policy into memory from the storage address by boot code or another secure software component initially loaded by a boot process. At this point, an entire boot process for software of the merchant device (e.g., operation system, bootloader, etc.) may use the signed boot policy to execute software on the merchant device.

In various examples, a bootloader (e.g., "Little Kernel" for an Android Bootloader), boot process, operating system, etc., may include various boot stages at which different tasks are accomplished to boot software. In some examples, the bootloader may be used in a Trusted Execution Environment, or "Trusty TEE," operating system. The bootloader may perform initialization of the merchant device in various boot stages, including hardware initialization, setting up vector tables, setting up a memory management unit, setting up a memory cache, initialize peripherals, setting up storage, performing cryptography, etc. For example, a first boot stage may include code download and compilation for the bootloader, a second boot stage may include kernel authentication, a third boot stage may include indenting device trees, or data structures, for describing the hardware, and so on. The number and complexity of boot stages involved in a bootloader process may vary depending on any number of factors, such as hardware of the merchant device that the bootloader process is running on, an operating system executing on the merchant device, different types and numbers of applications executing on the merchant device, and/or any other factors which may increase or decrease complexity of a bootloader process.

Generally, a bootloader process may include or define a sequence of boot stages that are to be performed. In some examples, each boot stage may be performed in sequence with the other stages, in parallel with other boot stages, or a combination of both. In some examples, each of the boot stages may be defined by separate code that it stored separately in memory and executes independently, such as once called by the bootloader process. In other examples, each boot stage may be part of a single piece of code that defines the bootloader process. The exact storage, execution, and timing of the boot stages in a bootloader process may vary depending on the software environment, the operating system, hardware configurations, or any other factor that may change a bootloader process for software. In some examples, the bootloader process may monitor the execution of the boot stages, or be defined by execution of the boot stages. Thus, a bootloader process may comprise code for monitoring boot stages, or be defined by pieces of code for the individual boot stages.

Regardless of the number of boot stages involved in the bootloader process, the techniques described herein may include verifying, at each stage of the bootloader process and using a public key, that the signature for the signed boot policy was signed using the private key of the payment service. For example, the techniques described herein may include using various forms of asymmetric encryption using an asymmetric-key pair of a public key and a private key. Each boot stage of the bootloader process may be associated with a boot-policy reader (e.g., code, scripts, software, etc.) which performs various functions for verifying the signed boot policy. For instance, the boot-policy readers may each store, or access, one or more public keys that are used to verify that the signed boot policy was in fact signed with a corresponding private key using asymmetrical encryption methods. Each of the boot-policy readers may store or access their own respective public key, or may access a common public key stored at the merchant device.

In some examples, the boot-policy readers for each stage of the boot process may further perform techniques for verifying that the signed boot policy includes an identifier (e.g., serial number, IP address, etc.) associated with the merchant device. For instance, the signature, or the signed boot policy itself, may include the identifier associated with the merchant device. The boot-policy readers may each know the identifier for their merchant device, and prevent their respective boot stages from booting or executing unless the identifier is confirmed as being included in the signed boot policy. Thus, at each boot stage in the bootloader process, a boot-policy reader may verify that the signed boot policy includes an identifier for the merchant device, and only allow the boot process to move, or boot, to a next boot stage if the signed boot policy is verified as including the corresponding merchant device identifier.

At each boot stage, once the respective boot-policy reader has verified the signed boot policy as being signed by the private key, and verified the signed boot policy as including the merchant device identifier, the boot-policy readers may analyze (e.g., parse, search, etc.) data of the signed boot policy (e.g., text, machine-readable data, etc.). In some examples, components of the merchant device may use one or more decryption keys to decrypt the data stored in the signed boot policy. The boot-policy readers may analyze the signed boot policy to determine whether the version of the software that their respective boot stage is attempting to execute is identified as being permitted, or allowed, by the signed boot policy. For instance, the boot-policy reader may analyze the boot policy to identify data in the signed boot policy, such as a "slot" in a table which has their respective boot stage name or identifier. The boot-policy reader may then determine, based on data in the signed boot policy, one or more versions of software that the boot-policy reader is permitted to allow their respective boot stage to execute. In some examples, the versions of the software may indicate a minimum software version such that the boot-policy reader may permit their boot stage to execute any version of software higher than the minimum software version. In other examples, the signed boot policy may simply indicate single, or multiple, specific software versions, a range of software versions, a maximum software version, or any other indication of a software version that the boot-policy reader can permit their boot stage to execute. In some examples, the different boot stages may be allowed to execute different versions of the software that the bootloader process is attempting to execute. If the boot-policy reader determines that the version of the software their respective boot stage is attempting to execute is indicated as being permissible or allowed by the signed boot policy, the boot-policy reader may cause or allow their boot stage to execute the version of the software and boot to a next boot stage. Otherwise, the boot-policy reader may stop, or prevent, execution of the bootloader process if their boot stage is attempting to execute a software version that is not granted permission by the signed boot policy.

Thus, the techniques described herein contemplate, at each stage of a bootloader process, (i) verifying, using a public key, a signed boot policy as being signed by a corresponding private key of a trusted entity, (ii) verifying that the signed boot policy includes an indication of a merchant device identifier, and (iii) determining whether a version of software attempting to be executed by the boot stage is allowed by the signed boot policy. In this way, the payment service is provided with additional flexibility and configurability for managing merchant devices of merchants who subscribe to their services. For instance, the payment service is able to customize a signed boot policy for specific merchant devices (e.g., allow older software versions for particular merchants without blowing fuses), and ensure that malicious entities are unable to install and execute software versions that are disallowed by the payment service to prevent loss of private data. Further, using a signed boot policy for each boot stage of a bootloader process, the payment service is able to customize which software versions are allowed for individual boot stages, which may provide for increased flexibility for compatibility with other software and/or hardware components of the merchant device. The signed boot policy may be used in other scenarios as well, such as indicating what types of applications are allowed to execute on a merchant device. Even further, boot policies may be created for specific merchants who have requested that particular applications be permitted for all of their merchant devices. Further, the signed boot policy may specify various security settings for different boot stages.

In some examples, the signed boot policies for merchant devices may be backed by fuses on the merchant devices. For instance, because the signed boot policies handle the verification for the boot stages, the fuses in the merchant device may all be set to prevent the signed boot policy from being rolled back to a previous version. Thus, if a malicious attacker attempts to load prior signed boot policies onto a merchant device which allow vulnerable software versions to execute, the fuses will prevent rolling back of the signed boot policies.

In various examples, the merchant devices may include multiple devices arranged as a merchant system. The merchant system can include a merchant user interface (UI) presented on a merchant-facing display and a customer UI presented on a customer-facing display. In some instances, the merchant UI can be presented on a display of a merchant device (also referred to as a first merchant device or the merchant-facing device), while the customer UI can be presented on a display of a customer device (also referred to as a second merchant device or the customer-facing device). In such instances, the merchant device and the customer device can be operably connected via a wired connection (also referred to as a physical connection) and/or a wireless connection (also referred to as a network connection).

In some examples, the customer device may be relatively simple in comparison to the merchant device and rely on the merchant device for various functionality, such as communicating over wireless networks using network interfaces, power supply, etc. In such examples, the payment service may further provide a signed boot policy over a wireless network to the merchant device, which in turn provides the customer device with its own signed boot-policy update. The customer device's signed boot-policy update may be the same as the merchant device's boot-policy update, or different than the merchant device's boot-policy update. For instance, the customer device's boot-policy update may be configured for different boot stages of a bootloader process on the customer device, for different hardware and/or software configurations on the customer device, etc. Further, the payment service may provide various software and software updates for each of the merchant device and the customer device. The merchant device may similarly provide the software or software updates to the customer device. Generally, the techniques described herein with respect to analyzing the signed boot policy at each stage of a bootloader process are similarly applicable to the customer device.

While the techniques described herein may be described with reference to particular software and/or hardware configurations, the techniques are applicable and scalable for any combination of software and/or hardware configurations. Stated otherwise, the use of a signed boot policy as described herein for various boot stages of a software bootloader process are applicable to any software or hardware environment. Further, while some of the techniques described herein are described with reference to processing payment transactions, the techniques are equally applicable in any environment or technology area in which anti-rollback techniques may be implemented. The techniques described herein are applicable to any software process, firmware process, bootloader process, or any other process executing on a computing device.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding introduction is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an example environment 100 in which a merchant 102 conducts transactions with customer(s) 104 for item(s)/service(s) 106, as well as a payment service 108 to authorize payment instrument(s) 110 of the customer(s) 104 for the transactions. For instance, the merchant 102 may input information associated with item(s)/service(s) 106 into a first merchant device 112, which can include a merchant-facing device. The customers 104 can then use a second merchant device 114, which can include a customer-facing device, to enter payment information associated with the payment instrument(s) 110. As described herein, the terms "merchant device," "merchant-facing device," "customer-facing device," "computing device," "POS device," or other devices may be used interchangeability depending on the environment being described. Based on receiving the payment information, the second merchant device 114 can encrypt the payment information, send the encrypted payment information to the first merchant device 112. The first merchant device 112 then sends the encrypted payment information to the payment service 108 for authorization.

As used in herein, a merchant device or merchant device (e.g., the first merchant device 112, the second merchant device 114, or a merchant system which includes both the first merchant device 112 and the second merchant device 114) may comprise any sort of mobile or non-mobile devices (e.g., electronic device(s)) that include instances of application(s) that execute on the respective merchant device. The application(s) may provide POS functionality to the merchant devices to enable the merchant 102 (e.g., owners, employees, etc.) to at least accept payments from the customer(s) 104. In some types of businesses, the merchant devices may correspond to a store or other place of business of the merchant 102, and thus, may be a fixed location that typically does not change on a day-to-day basis. In other types of businesses, however, the location of the merchant devices may change from time to time, such as in the case that the merchant 102 operates a food truck, is a street vendor, is a cab driver, etc., or has an otherwise mobile business, e.g., in the case the merchant 102 sells items at buyer's homes, places of business, and so forth. In either of the examples above, the place of business of the merchant 102 may be referred to as a physical establishment 116.

Additionally, as used herein, a merchant 102 (also referred to as an "entity") may include any business engaged in the offering of items (e.g., goods, services, etc.) for acquisition by customer(s) 104. Actions attributed to a merchant 102 may include actions performed by owners, employees, or other agents of the merchant 102, and thus no distinction is made herein unless specifically discussed. In addition, as used herein, a customer 104 may include any entity that acquires items or services from a merchant 102, such as by purchasing, renting, leasing, borrowing, licensing, or the like. Hereinafter, items and/or services offered by merchants 102 may be referred to solely as items. Thus, a merchant 102 and a customer 104 may interact with each other to conduct a transaction in which the customer 104 acquires an item from a merchant 102, and in return, the customer 104 provides payment to the merchant 102.

As used herein, a transaction may include a financial transaction for the acquisition of items and/or services that is conducted between customer(s) 104 and the merchant 102. For example, when paying for a transaction, a customer 104 can provide the amount that is due to the merchant 102 using cash or other payment instrument 110 (e.g., a debit card, a credit card, a stored-value or gift card, a check, through an electronic payment application on a device carried by the customer 104, or the like). For instance, as discussed above, the customer 104 can interact with the second merchant device 114 to process the transaction, such as by inputting (e.g., manually, using a magnetic card reader or an RFID reader, etc.) identifiers (e.g., payment information, such as a card number, account number, or any other account information) associated with the payment instrument 110. For example, a payment instrument 110 of the customer 104 may include one or more magnetic strips for providing card and customer information when swiped in a card reader. In other examples, the payment instrument 110 may include other types of payment cards may be used, such as smart cards having a built-in memory chip that is read by the second merchant device 114 when the card is "dipped" into the reader, a radiofrequency identification tag, or so forth.

During a transaction between a merchant 102 and a customer 104, the merchant 102 may input transaction information describing the transaction into the first merchant device 112, such as an amount of payment received from the customer 104, the item(s)/service(s) 106 acquired by the customer 104, a time, place and date of the transaction, a card network associated with the payment instrument 110, an issuing bank of the payment instrument 110, a name of the customer 104, and so forth. The first merchant device 112 can then receive the payment information from the second merchant device 114 via a connection 118, which may be encrypted, and send the transaction information along with the payment information to the payment service 108 over one or more networks 120, either substantially contemporaneously with the conducting of the transaction (in the case of online transactions) or later when the first merchant device 112 is in the online mode (in the case offline transactions). As described herein, the network(s) 120 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

The payment service 108 may include one or more processors 122 and memory 124, which may store an operating system 126, a payment processing component 128, an identification component 130, an update module 132, a boot-policy component 132, a software-update component 134, an encryption/decryption component 136, and databases(s) 138. The payment processing component 128 may function to receive the information regarding the transaction from the first merchant device 112 and attempt to authorize the payment instrument 110 used to conduct the transaction. The payment processing component 128 may then send an indication of whether the payment instrument 110 has been approved or declined back to the first merchant device 112.

Generally, when a customer 104 and a merchant 102 enter into an electronic payment transaction, the transaction is processed by electronically transferring funds from a financial account associated with the customer 104 to a financial account associated with the merchant 102. As such, the payment processing component 128 may communicate with one or more computing devices of a card-payment network (or "card-payment network-devices") 140, e.g., MasterCard®, VISA®, over the network 120 to conduct financial transactions electronically. The payment processing component 128 can also communicate with one or more computing devices of one or more banks 142, processing/acquiring services, or the like over the network 120. For example, the payment processing component 128 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue payment instrument(s) 110 to customer(s) 104, and may pay acquiring banks for purchases made by customer(s) 104 to which the issuing bank has issued the payment instrument(s) 110. Accordingly, in some examples, the computing device(s) of an acquiring bank may be included in the card payment network and may communicate with the computing devices of a card-issuing bank to obtain payment. Further, in some examples, a customer 104 may use a debit card instead of a credit card, in which case, the bank computing device(s) of a bank corresponding to the debit card may receive communications regarding a transaction in which the customer 104 is participating. Additionally, there may be computing devices of other financial institutions involved in some types of transactions or in alternative system architectures, and thus, the foregoing are merely several examples for discussion purposes.

In the example environment 100 of FIG. 1, the payment service 108 may receive, either intermittently or as part of the transaction information, an identifier 144 (e.g., serial number, IP address, merchant account number, etc.) associated with the first merchant device 112 and/or the second merchant device 114. Further, the payment service 108 may receive a boot-policy version and/or a software version 146 which indicate versions of a boot policy or software stored at the first merchant device 112 and/or the second merchant device 114. In some examples, the identification component 130 may utilize the identifier(s) 144 provided from one or both of the merchant devices 112 and/or 114, and compare the identifier(s) 144 to database of identifier(s) 148 that the payment service 108 stores for various merchant devices 112/114. In some instances, each of the identifier(s) 148 within the database 138 may be associated with a respective merchant device 112/114, and may identify the respective merchant device by serial number, hardware identification, or the like. As such, the identification component 130 can match the identifier 144 received from the first merchant device 112 to one of the identifier(s) 148 stored in the database 138 to identify the first merchant device 112. The identifier(s) 148 may further group merchant devices 112/114 based on various characteristics, such as grouping merchant devices that are owned or registered with a same merchant account, grouping merchant devices that are of a same type or version of device, grouping merchant devices into beta or testing groups, grouping merchant devices based on software and/or hardware versions, etc.

Once the identification component 130 has identified the merchant devices 112 and/or 114, the boot-policy component 132 may determine which boot-policy versions 146 are stored on the merchant devices 112 and 114. In some examples, the boot-policy component 132 may determine the boot-policy versions 146 currently stored on the merchant devices 112/114 based on the information received in the boot-policy version message 146. In other examples, the boot-policy component 132 may determine the boot-policy versions 146 based on indications stored in the databases 138 of what boot policy is currently stored on the merchant devices 112 and 114. Upon determining, what boot policy is stored on the merchant devices 112 and 114, the boot-policy component 132 may analyze the boot-policy update(s) 150 to determine whether the first merchant device 112 and/or the second merchant device 114 require boot-policy update(s) 150. For instance, the boot-policy component 132 may determine that the first merchant device 112 requires a boot-policy update 150(1), and the second merchant device 114 requires a boot-policy update 150(2). In some examples, the boot-policy component 132 may determine that a group of merchant devices that include the first merchant device 112 and/or the second merchant device 114 require boot-policy update(s) 150. The boot-policy update(s) 150 may be periodically updated by an owner or operator of the payment service 108. Using similar techniques, the software-update component 134 may determine whether the first merchant device 112 and the second merchant device 114 each require software update(s) 152. In some examples, the payment service may securely update one or both of the first merchant device 112 and/or the second merchant device 114 with respective boot-policy update(s) 150 and/or respective software update(s) 152 at a same time, or at different times.

Upon determining that at least one of the first merchant device 112 and/or the second merchant device 114 require a boot-policy update 150, the boot-policy component 132 may utilize one or more private keys 154 stored at the payment service to sign the boot-policy update(s) 150. The boot-policy component 132 may sign the boot-policy updates 150 using the private keys 154 to generate a signature on a signed boot-policy update. In some examples, the boot-policy component 132 may further include, either as part of the bot policy update 150 or the signature for the signed boot-policy update, an indication of the identifier 148 of the first merchant device 112 and/or the second merchant device 114. In some examples, the encryption/decryption component 136 may further encrypt data included in the signed boot-policy updates using encryption key(s) 156 stored at the payment service 108.

Once the respective boot-policy updates 150 have been signed using the private key(s) 154 to generate or create a signed boot-policy updates including a signature along with an identifier for the first merchant device 112 and/or the second merchant device 114, the payment service 108 may send, using one or more network interface(s) 158 of the payment service 108 and via the network(s) 120, the signed boot-policy update(s) 160 to the first merchant device 112. Further, the payment service 108 may send software update(s) 162, which may be encrypted using the encryption key(s) 156, to the first merchant device 112. However, in some examples the signed boot-policy update(s) 160 may be sent independently of software update(s) 162.

Upon receiving the signed boot-policy update(s) 160, the first merchant device 112 may store a first signed boot-policy update(s) 160 to its local memory, and may communicate a second signed boot-policy update(s) 160 to the second merchant device 114 over the connection 118. Similarly, upon receiving software update(s) 162, the first merchant device 112 may store a first software update(s) 162 to its local memory, and may communicate a second software update(s) 162 to the second merchant device 114 over the connection 118.

The first merchant device 112 and/or the second merchant device 114 may utilize the signed boot-policy update(s) 160 to determine which versions of software are permitted to be executed on the first merchant device 112 and/or the second merchant device 114. Additional details of the signed boot-policy update(s) 160, and techniques for utilizing the signed boot-policy update(s) 160, are described below with reference to FIGS. 2A and 2B.

In various examples, the first merchant device 112 and/or the second merchant device 114 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a smart watch, an optical head-mounted display (OHMD), etc.), a portable media player, a television, a set-top box, a computer system in an automobile (e.g., navigation system), an appliance, a camera, a robot, a hologram system, a security system, a home-based computer system (e.g., intercom system, home media system, etc.), a projector, an automated teller machine (ATM), and so on.

In some examples, the payment service 108 may comprise network-accessible resource(s) implemented as one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

Figure 2A:
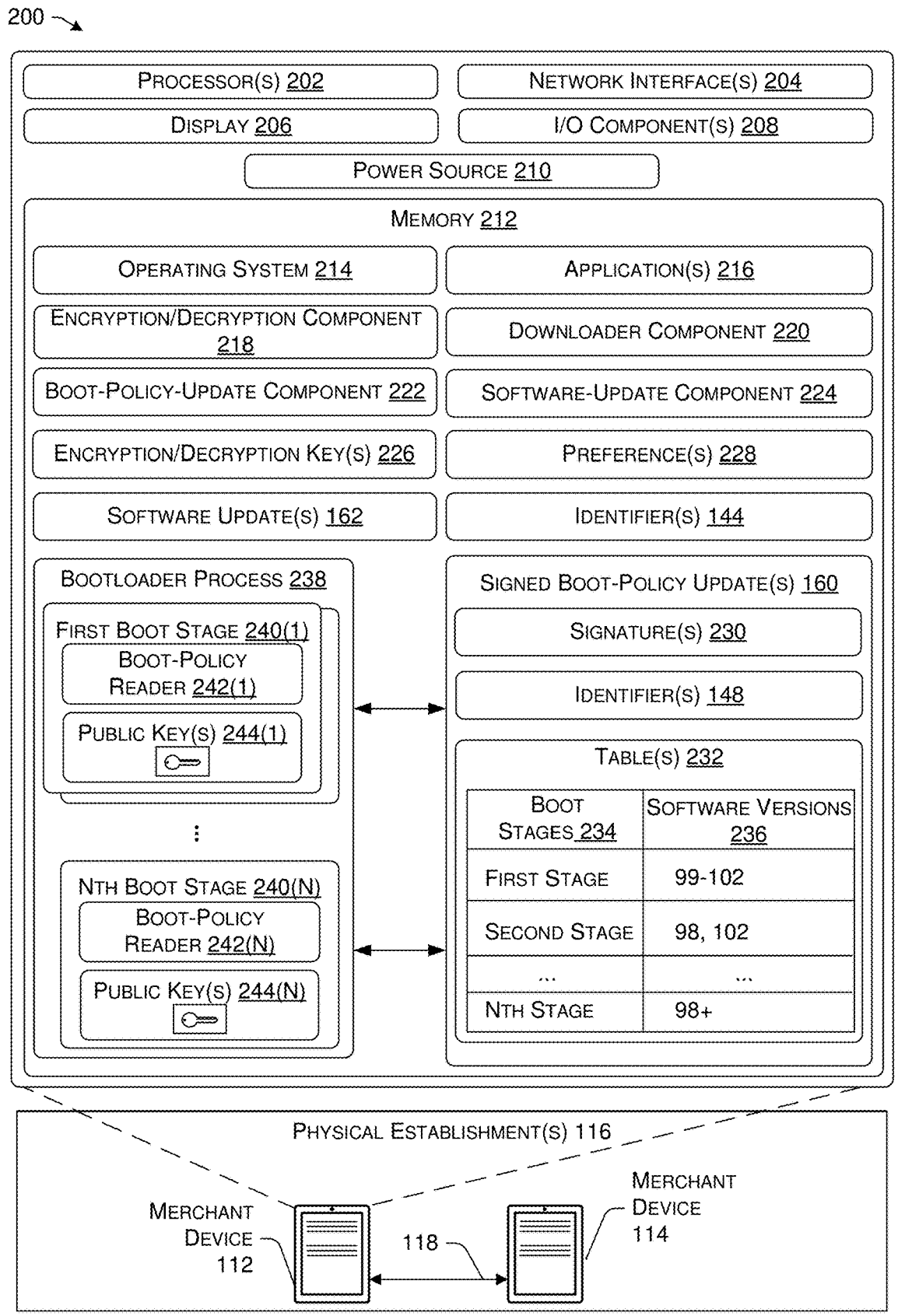
FIG. 2A depicts an example merchant-facing computing device executing a bootloader process according to a signed boot policy.

FIG. 2A depicts an example environment 200 of a merchant system (i.e., the first merchant device 112 and the second merchant device 114), where components of the first merchant device 112 (e.g., merchant facing computing device) executes a bootloader process according to a signed boot policy.

As shown, the first merchant device includes processor(s) 202, network interface(s) 204, a display 206, input/output (I/O) component(s) 208, a power source 210, and a memory 212.

The memory 212 may store various components, such as an operating system 214, one or more applications 216, an encryption/decryption component 218, a downloader component 220, a boot-policy-update component 222, a software-update component 224, one or more encryption/decryption keys 226, one or more preferences 228, software updates 162, one or more identifiers 144, and one or more signed boot-policy updates 160.

In some examples, the operating system 214 may manage various software, firmware, and/or hardware resources of the first merchant device 200. Further, the operating system 214 may perform other functionality for managing resources (e.g., managing memory resources 212) and/or functions of the first merchant device 112.

The applications 216 may facilitate transactions on behalf of the merchant 102. For instance, the applications 216 may receive information such as an amount of payment received from a customer 104, the item(s)/service(s) 106 acquired by the customer 104, a time, place and date of the transaction, a card network associated with the payment instrument 110, an issuing bank of the payment instrument 110, a name of the customer 104, and so forth. The applications 216 may then receive the payment information from the second merchant device 114 via a connection 118, which may be encrypted, and send the transaction information along with the payment information to the payment service 108 over one or more networks 120. In various examples, any other types of applications 216 may be stored on the computing device depending on various factors such as an industry of the merchant 102, a type of business of the merchant 102, and so on.

The first merchant device 112 may utilize the encryption/decryption component 218 to decrypt and/or encrypt various data using the encryption/decryption keys 226. For instance, the encryption/decryption component 218 may decrypt data (e.g., signed boot-policy update(s) 160, software update(s) 162, etc.) received from the payment service 108, as well as data received from the second merchant device 114 over the connection 118 (e.g., payment transaction data). Further, the encryption/decryption component 218 may use the encryption/decryption keys 226 to encrypt data sent to the payment service 108 (e.g., identifier 144, transaction data, etc.).

The first merchant device 112 may utilize the software-update component 224 to implement the software updates 162 to update software on the first merchant device 112 (e.g., operating system 214, applications 216, or other software). To update the software, the software-update component 224 can retrieve the software updates 162 and update the software on the device 112 using the updated version. After updating the software, the first merchant device 112 can reboot to finish the updating process. Similarly, the boot-policy-update component 222 may update and/or replace the signed boot-policy update(s) 160 that are stored in the memory 212.

The first merchant device 112 further stores preference(s) 228 in the memory 212. In some instances, the first merchant device 112 can send the preference(s) 228 to the second merchant device 114 each time the second merchant device 114 is connected to the first merchant device 112 and/or each time the second merchant device 114 is updated. For instance, the first merchant device 112 can determine, via the physical connection 118, that the second merchant device 114 rebooted into a payments mode. The first merchant device 112 can then send, via the physical connection 118, data associated with the preference(s) 228 to the second merchant device 114 in response. The preference(s) 240 can include an identifier (e.g., name, logo, etc.) for the merchant, a background image that the second merchant device will display to customers, or the like.

The identifiers 144 stored at the first merchant device 112 may include any type of identifiers associated with the first merchant device 112 and/or the merchant 102, such as a serial number of the first merchant device 112, an internet protocol (IP) address of the first merchant device 112, an account number of the merchant 102 who owns or operates the first merchant device, etc.

As described above, the signed boot-policy updates 160 may include a signature 230 created by the payment service 108 when the payment service 108 signed a boot-policy update 150 using the private key 154. In this way, the signed boot-policy updates 160 may be verified as being signed by the private key based on the signature 230. Further, the signed boot-policy update 160 may include the identifier 148, which may correspond to identifier(s) 144. The identifier 148 may be used to indicate that the signed boot-policy update 160 is intended for the first merchant device 112. Further, the identifier 148 may prevent signed boot policies intended for potentially less secure devices from being installed on the first merchant device 112.

The signed boot-policy update 160 may further include a data structure, such as one or more tables 232, which provide indications, for various boot stages 234, of software versions 236 that are permitted to be executed at the various boot stages 234. As illustrated, the first stage 234 has a range of permissible software versions (e.g., versions 99-102) which are indicated as permissible to be executed at a first boot stage 234. A second boot stage 234 may correspond to different permissible software versions 236 (e.g., 98, and 102) compared to those of the first boot stage 234. Finally, the Nth boot stage 234 may indicate a minimum software version 232 that is permissible for an Nth boot stage 234. Thus, in some examples, the software versions 236 that are permissible for execution at the different boot stages 234 may be the same, or different, than other boot stages 234. While illustrated as entries in a table 232, the boot stages 234 and their corresponding permissible software versions 236 may be stored in any format or arrangement. Additionally, depending on various factors and complexities, the number of entries in the table 232 may vary based on a number of boot stages 234. While not illustrated, the signed bot policy update(s) 160 may further include indications of applications 216 and/or versions of applications 216 that are permitted to be executed on the first merchant device 112.

In various examples, the bootloader process 238 may utilize the signed boot-policy update 160 to complete execution of each stage of the bootloader process. The bootloader process 238 may include any number of boot stages 240(1)-(N) (e.g., 1, 3, 5, 10, 20, etc.) depending on the complexity of the first merchant device 112 and the software executing thereon. The bootloader process 238, or processes, may correspond to any software (e.g., operating system 214, applications 216, or other bootloader process) stored on the first merchant computing device 112. In some examples, each of the boot stages 240(1)-(N) may include respective boot-policy readers 242(1)-(N). Generally, the boot-policy readers 242 may include code, scripts, or other software and/or logic configured to verify and/or analyze the signed boot-policy updates 160. For instance, the boot-policy readers 242 may verify, at each stage 240 of the bootloader process 238 and using one or more public keys 244(1)-(N), that the signature 230 for the signed boot-policy update 160 was signed using the private key 154 of the payment service 108. For example, the boot-policy readers 242(1)-(N) may use various forms of asymmetric encryption using an asymmetric-key pair of the public key 244 and the private key 154 to verify the signature 230. Each boot-policy reader 242 may each store, or access, one or more public keys 244 that are used to verify that the signed boot-policy update 160 was in fact signed with a corresponding private key 154 using asymmetrical encryption methods. Each of the boot-policy readers 242(1)-(N) may store or access their own respective public key 242, or may access a common public key 242 stored at the first merchant device 112.

In some examples, each of the boot-policy readers 242 for each stage 240 of the bootloader process 238 may further perform techniques for verifying that the signed boot-policy update 160 includes an identifier 148 (e.g., serial number, IP address, etc.) associated with the first merchant device 160. For instance, the signature 230, or the signed boot-policy update 160 itself, may include the identifier 148 associated with the first merchant device 112. The boot-policy readers 242(1)-(N) may each know the identifier 148 for their merchant device 112 (e.g., query the identifiers 144), and prevent their respective boot stage 240 from booting or executing unless the identifier 148 is confirmed as being included in the signed boot-policy update 160. Thus, at each boot stage 240(1)-(N) in the bootloader process 238, a boot-policy reader 242 may verify that the signed boot-policy update includes the identifier 148 for the merchant device 112, and only allow the bootloader process 238 to move, or boot, to a next boot stage if the identifier 148 of the signed boot-policy update 160 is verified as including the correspond merchant device identifier 144.

In various examples, the bootloader process 238 may be implemented by a bootloader (e.g., "Little Kernel" for an Android Bootloader), and may include the various boot stages 240(1)-(N) at which different tasks are accomplished to boot software. In some examples, the bootloader may be used in a Trusted Execution Environment, or "Trusty TEE," operating system. The bootloader may perform initialization of the first merchant device 112 in various boot stages 240(1)-(N), including hardware initialization, setting up vector tables, setting up a memory management unit, setting up a memory cache, initialize peripherals, setting up storage, performing cryptography, etc. For example, a first boot stage 240(1) may include code download and compilation for the bootloader, a second boot stage 240(2) may include kernel authentication, a third boot stage 240(3) may include indenting device trees, or data structures for describing the hardware, and so on. The number and complexity of boot stages 240(1)-(N) involved in the bootloader process 238 may vary depending on any number of factors, such as hardware of the merchant device 112 that the bootloader process 238 is running on, an operating system 214 executing on the merchant device 112, different types and numbers of applications 216 executing on the merchant device 112, and any other factors which may increase or decrease complexity of a bootloader process 238.

As shown in FIG. 2A, each of the boot-policy readers 242(1)-(N) may further be configured to analyze the table 232 to identify a listing for their respective boot stage 234, and identify the permissible software versions 236 associated with the respective boot stage 240. If the software version of the boot stage 240 is included in one or more of the permissible software versions 236 indicated in the signed boot-policy updates 160, then the boot-policy readers 242 may allow or indicate that the boot stage 240 is allowed to boot to a next boot stage 242.

In some examples, the software versions 236 may indicate a minimum software version 236 (e.g., Nth stage indicates version 98 or higher) such that the boot-policy reader 242(N) may permit their boot stage 240(N) to execute any version of software higher than the minimum software version "98". In other examples, the signed boot-policy update 160 may simply indicate single or multiple specific software versions (e.g., second stage 234 indicates version 98 and 102 are permissible), a range of software versions (e.g., first stage 234 indicates versions 99-102 are permissible), a maximum software version, or any other indication of a software version 236 that the boot-policy reader 242 can permit their boot stage 240 to execute. In some examples, the different boot stages 240 may be allowed to execute different versions of the software that the bootloader process is attempting to execute. If the boot-policy reader 242 determines that the software version 236 their respective boot stage 240 is attempting to execute is indicated as being permissible or allowed by the signed boot-policy update 160, the boot-policy reader 242 may cause or allow their boot stage 240 to execute the software version 236 and boot to a next boot stage 240. Otherwise, the boot-policy reader 242 may stop execution of the bootloader process 238 if their boot stage 240 is attempting to execute a software version 236 that is not granted permission by the signed boot-policy update 160. While the Nth boot stage 240(N) is indicated as corresponding to a same number of Nth boot stages 234, in some examples, there may be more or less boot stage entries 234 in the table than boot stages 240. For instance one or more boot stages 240 may not have entries in the table 232, or have multiple entries in the table 232.

Figure 2B:
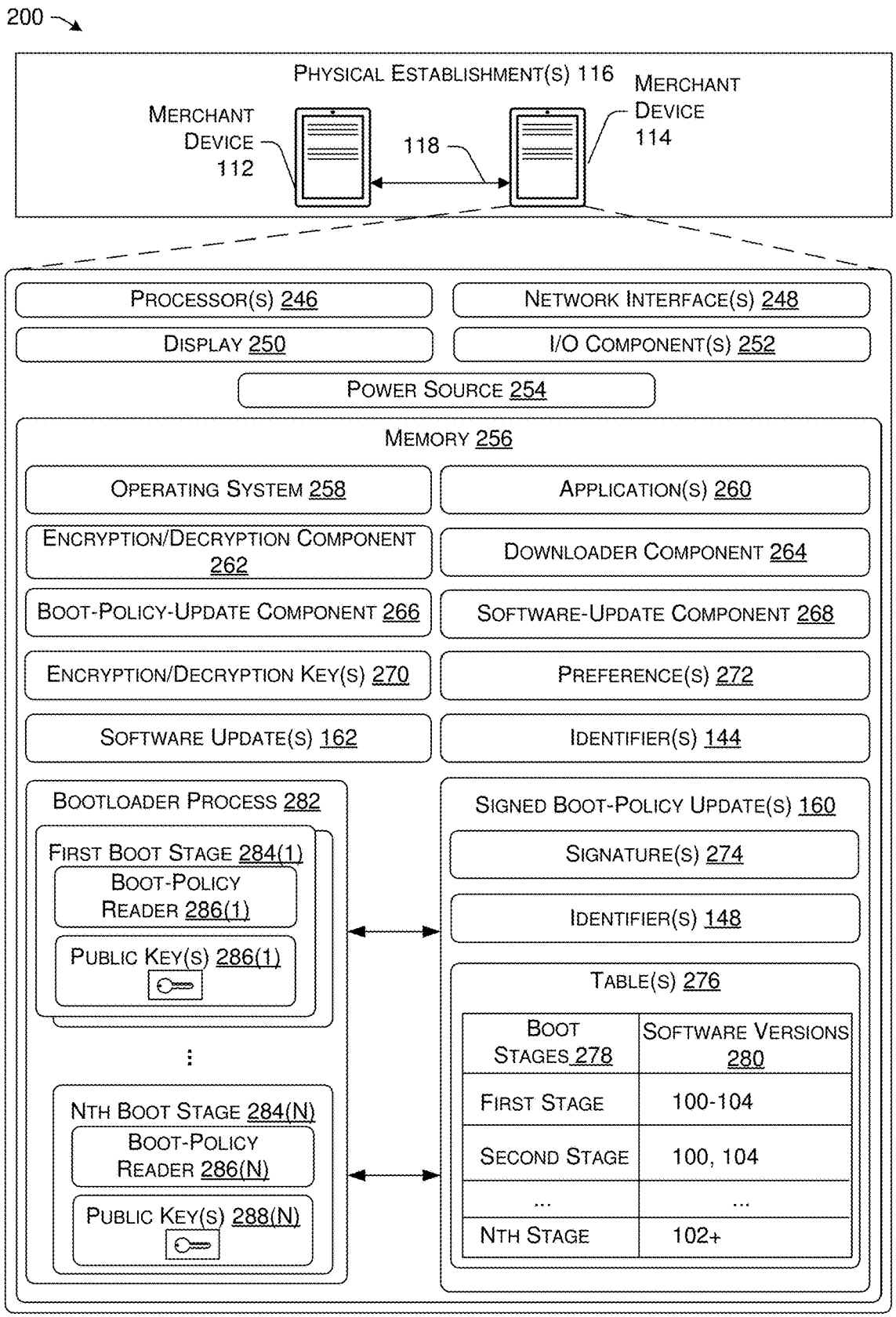
FIG. 2B depicts an example customer-facing computing device executing a bootloader process according to a signed boot policy.

FIG. 2B depicts the example environment 200 of the merchant system (i.e., the first merchant device 112 and the second merchant device 114), where components of the second merchant device 114 (e.g., customer-facing computing device) executes a bootloader process 282 according to a signed boot-policy update 160.

Generally, insofar as components of the second merchant device 114 mirror those of the first merchant device 112, the functionality will be substantially similar. However, various components of the second merchant device 114 will differ from those of the first merchant device 112. For example, the network interfaces 248 of the second merchant device 114 may comprise physical connections which couple the second merchant device 114 to the first merchant device 112. Thus, in examples where the network interfaces 248 of the second merchant device 114 are physical connections, the first merchant device 112 may download data, and transmit data, on behalf of the second merchant device 114. In this way, the interactions between the second merchant device 114 and the payment service 108 may be performed with the first merchant device 112 acting as a middle-man to transmit and receive data over the networks 120 on behalf of the second merchant device 114. Further, the operating system 258, applications 260, software updates 162, identifier 144, bootloader process 282, and signed boot-policy updates 160 may vary from the respective components of the first merchant device 112. As an example, the operating system 258, applications 260, software updates 162, identifier 144, bootloader process 282, and signed boot-policy updates 160 may perform different functionality, such as providing services for interacting with a customer 104 considering the second merchant device 114 is a customer-facing device. Further, the number of boot stages 284(1)-(N) may be less, or more, than the number of the boot stages 240(1)-(N) of the first merchant device 112. Additionally, the software versions 280 may be different versions, and/or correspond to different types of software altogether.

Additionally, the power source 254 may comprise battery power, or be powered from the first merchant device 112. For example, the power source 210 may comprise mains power (e.g., wall outlet), and the first merchant device 210 may then provide power to the second merchant device 114 through the physical connection 118. Further, the identifiers 144 and 148 for the second merchant device 114 will be different than those of the first merchant device 112.

In some examples, the I/O components 208 and the I/O components 252 may include peripheral input devices, such as a keyboard, a mouse, a pen, a game controller, a voice input device, a touch input device, a gestural input device, or any other device capable of receiving input. The input may include input events, e.g., a merchant or a customer touching or simulating a touch by placing a finger in proximity to a respective display (e.g., a presence-sensitive display), or by using a keyboard or other input mechanism. In various examples, the input may comprise a series of input events related to processing transactions via the first software and the second software, such as processing payment for goods and/or services.

As described herein, a display (e.g., the display 206, the display 250, etc.) may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphic interface presented on the display. Accordingly, implementations herein are not limited to any particular display technology.

In some examples, the one or more processors 122, 202, and 246 may execute one or more modules, components, and/or processes to cause the payment service 108, first merchant device 112, and the second merchant device 114 to perform a variety of functions, as set forth above and explained in further detail in the following disclosure. In some examples, the processors 122, 202, and 246 may each include a central processing unit (CPU), a graphics processing unit (GPU), both CPU and GPU, or other processing units or components known in the art. Additionally, each of the processors 122, 202, and 246 may possess its own local memory, which also may store program modules, program data, and/or one or more operating systems.

Depending on the exact configuration and type of the payment service 108, first merchant device 112, and the second merchant device 114, the memory 124, 212, and 256 may comprise computer-readable media and may include volatile memory (such as RAM), non-volatile memory (such as ROM, flash memory, miniature hard drive, memory card, or the like), or some combination thereof. The computer-readable media (as well as all other types of memory or storage described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

In various examples, input/output components(s) 208 and 248 may include a keyboard, a mouse, a pen, a voice input device, a touch input device, a display, etc. Furthermore, the network interfaces 158, 204, and/or 248 may include a network interface for interfacing with the network(s) 120. The network interfaces 158, 204, and/or 248 may be any network interface hardware components that may allow the devices 108, 112, and 114 to communicate over the network(s) 120. The one or more networks 120 may be any type of network, such as a local area network or a wide area network, such as the Internet, and may include a wireless network, such as a cellular network, a local wireless network, such as Wi-Fi and/or close-range wireless communications, such as Bluetooth® and Bluetooth® low energy, a wired network, or any other such network, or any combination thereof. Accordingly, the one or more networks 120 may include both wired and/or wireless communication technologies, including Bluetooth®, Bluetooth® low energy, Wi-Fi, and cellular communication technologies, as well as wired or fiber optic technologies. Components used for such communications can depend at least in part upon the type of network, the environment selected, or both. Consequently, one or more computing devices of the environment 100 may communicatively couple to the one or more networks 120 in any manner, such as by a wired or wireless connection.

In at least one example, the terms "module" and/or "component" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processors 122, 202, and 246) to configure the devices 108, 112, and/or 114 to execute instructions and to perform operations described herein.

FIGS. 3A-5 illustrate various processes for implementing a policy-based anti-rollback mechanism at various boot stages of a bootloader process. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

Figure 3A:
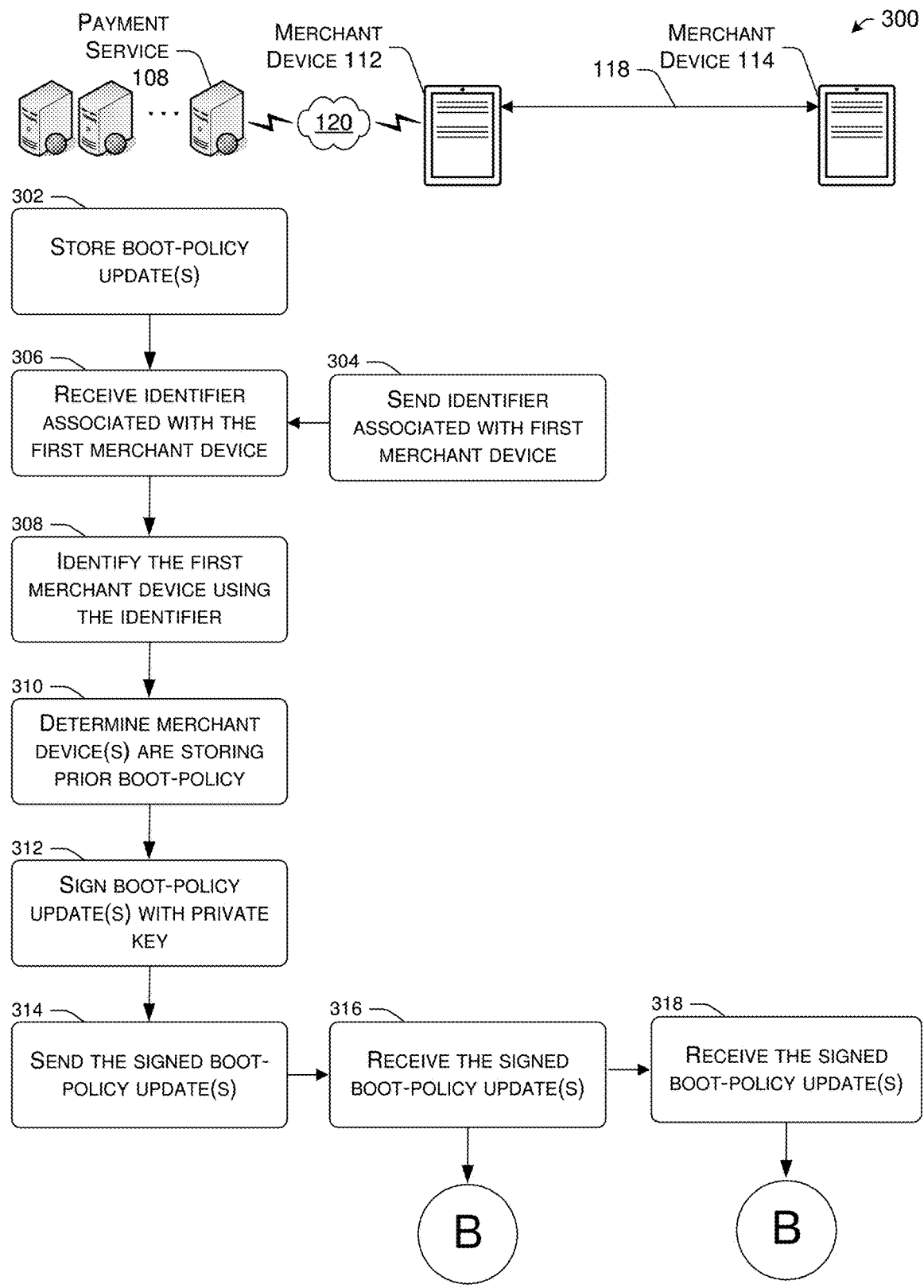
FIGS. 3A and 3B illustrate a flow diagram of an example process for a payment service providing signed boot policies to a first merchant device and a second merchant device to execute a bootloader process according to the signed boot policies.
Figure 3B:
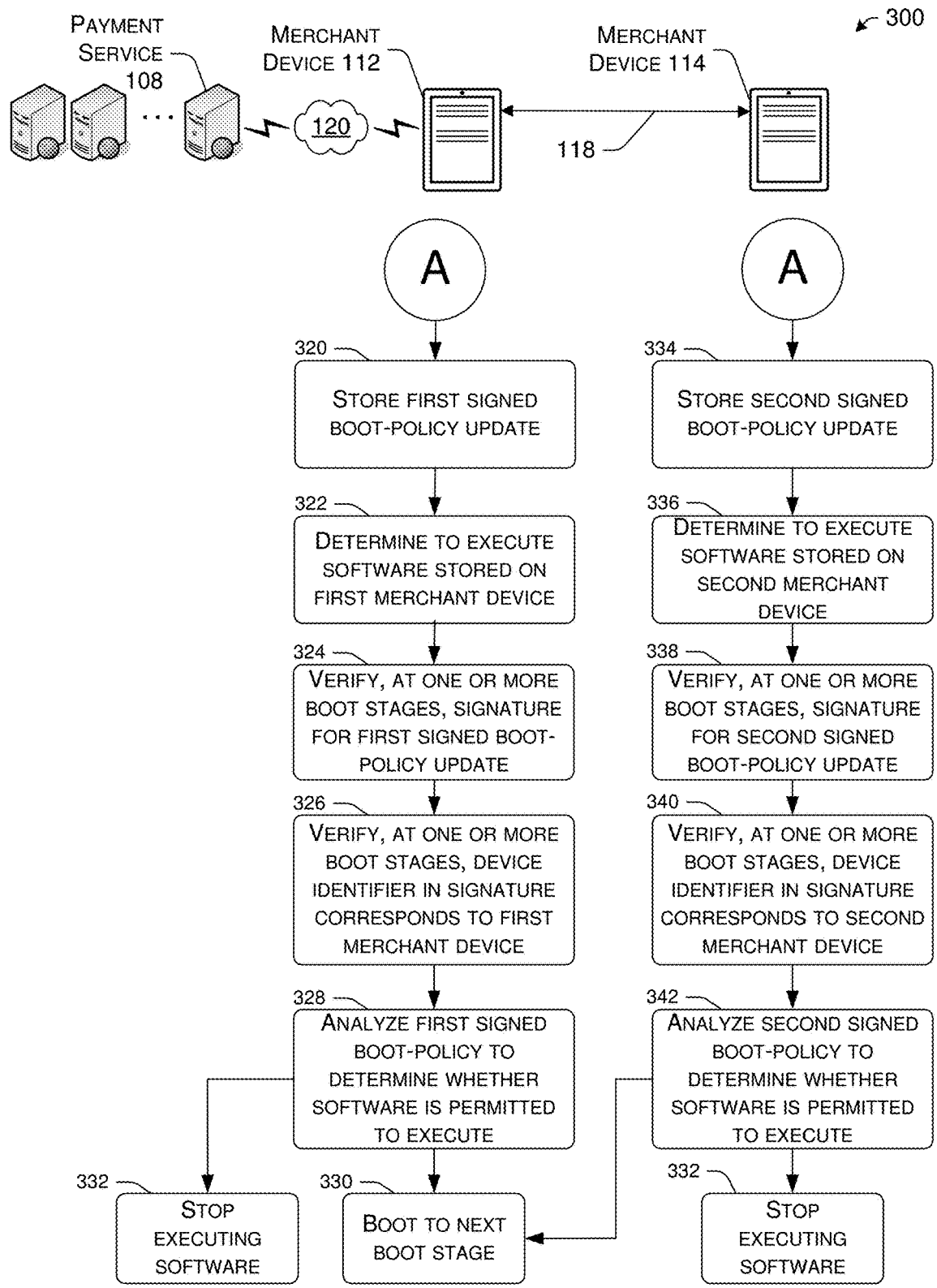

FIGS. 3A and 3B illustrate a flow diagram of an example process 300 for a payment service 108 providing signed boot policies to a first merchant device 112 and a second merchant device 114 to execute a bootloader process 238 and 282 according to signed boot policies 160.

At 302, the payment service 108 may store one or more boot-policy updates 150. In various examples, the boot-policy updates may be generated or provided by an owner or operator of the payment service 108. The boot-policy updates 150 may include indications of one or more versions of software that merchant devices 112/114 are permitted to execute. In some instances, the boot-policy updates 150 may prevent rollback of software versions executing on the merchant devices 112/114.

At 304, the first merchant device 112 may send, via one or more networks 120, one or more messages including boot-policy versions 146 indicating what boot-policy versions are being stored locally at the first merchant device 112 and/or the second merchant device 114. Further, the first merchant device 112 may further send an identifier associated with the device to enable the payment service 108 to identify the first merchant device 112.

At 306, the payment service 108 may receive one or more identifiers 144 from the first merchant device 112 and over a wired or wireless network 120. The identifiers 144 may include at least one of a serial number, IP address, customer 104 account number, or other identifiers that identify the first merchant device 112 and/or second merchant device 114. Further, the payment service 108 may receive one or more of boot-policy versions/software versions for at least one of first merchant device 112 or second merchant device 114.

At 308, the payment service 108 may identify the first merchant device 112, and/or the second merchant device 114, based on the identifiers 144 received. For instance, the payment service may determine which indications of device identifiers 148 stored at the payment service 108 correspond to the identifiers 144, and identify the first merchant device 112 and/or second merchant device 114.

At 310, the payment service 108 may determine that the first merchant device 112 is storing a prior boot policy, and/or determine that the second merchant device 114 is storing a prior boot policy. For instance, the payment service 108 may analyze the boot-policy version 146 received from for each of the first merchant device 112 and the second merchant device 114 and determine whether the boot policies on each of the devices 112/114 need to be updated. In other examples, the payment service 108 may track which boot policies have been sent to the first merchant device 112 and/or second merchant device 114. The payment service 108 may compare the boot-policy version 146 for each of the devices 112 and 114 and determine that at least one of the devices 112 or 114 is storing a prior boot policy.

At 312, the payment service 108 may sign a boot-policy update 150 using a private key 154 to provide a signed boot-policy update 160 for at least one of the first merchant device 112 or the second merchant device 114. The signed boot-policy update(s) 160 may include a signature along with an identifier (e.g., serial number) for the respective device 112/114.

At 314, the payment service 108 may send one or more signed boot-policy update(s) 160 to the first merchant device 112 over the networks 120. At 316, the first merchant device 112 may receive the signed boot-policy update(s) 160. In examples where the signed boot-policy updates 160 include a signed boot-policy update 160 for the second merchant device 114, the first merchant device 112 may send, at 318, the signed boot-policy update 160 to the second merchant device 114 via the physical connection 118.

In examples where the payment service 108 sends a signed boot-policy update 160, at 320, the first merchant device 112 may store the signed boot-policy update 160 in memory of the first merchant device 112. For instance, the first merchant device may store the signed boot-policy update 160 in non-volatile memory, such as in embedded MultiMediaCard (eMMC) memory.

At 322, the first merchant device 112 may determine to execute software stored on the first merchant device 112. For example, upon receiving and storing the signed boot-policy update 160, components of the first merchant device 112 may force a reboot of the first merchant device 112, load the signed boot-policy update 160 from storage into memory, and execute a bootloader process 238 for software installed on the first merchant device 112 (e.g., operating system 214, bootloader program, applications 216, etc.). In other examples, the components of the first merchant device 312 may force reboot of the software to reboot a respective bootloader process 238.

At 324, a boot-policy reader 242 may verify, at a respective boot stage 240, the signature 230 for the signed boot-policy update 160. In some examples, verifying the signature 230 may include the use of a public key 244 to verify that the signature 230 was created or signed using a corresponding private key 154. The boot-policy reader 242 may be configured to perform various asymmetrical encryption techniques to verify the signature 230 using the public key 244.

At 326, the boot-policy reader 242 may verify that a device identifier 148 in the signed boot-policy update 160 corresponds to a device identifier 144 of the first merchant device 112. For instance, the boot-policy reader 242 may be configured to compare serial numbers in the signed boot-policy update 160 with a serial number of the first merchant device 112.

At 328, the boot-policy reader 242 may analyze (e.g., parse, search, etc.) the signed boot-policy update 160 to determine whether the software is permitted to execute on the first merchant device 112. For example, the boot-policy reader 242 may identify a location in the signed boot-policy update 160, such as a table 232, which indicates which software versions 236 and/or type are permitted to execute for the corresponding boot stage 234.

At 330, if the boot-policy reader 242 determines that that the version of the software associated with the boot stage 240 is included in the one or more software versions 236 that the first merchant device 112 is permitted to execute, the boot-policy reader may, at 330, allow or cause the boot stage 240 to execute and move to the next boot stage 240 of the bootloader process 238.

Alternatively, if the boot-policy reader 242 determines that the version of the software associated with the boot stage 240 is not included in the one or more software versions 236 associated with the boot stage 240, the boot-policy reader may, at 332, disallow, or stop, execution of the bootloader process 238.

In various examples, for every boot stage 240(1)-(N) of the bootloader process 238, respective boot-policy readers 242(1)-(N) may perform steps 324-328 and proceed through the boot stages 240(1)-(N) until the bootloader process 238 has completed, or has been stopped.

In some examples, the payment service 108 sends a signed boot-policy update 160 for the second merchant device 114, and the first merchant device 112 sends, at 318, the signed boot-policy update 160 to the second merchant device. In such examples, the components of the second merchant device 114 may perform similar techniques to those of 320-328 in steps 334-342 with its own respective signed boot-policy update 160 and its respective bootloader process 238.

Figure 4:
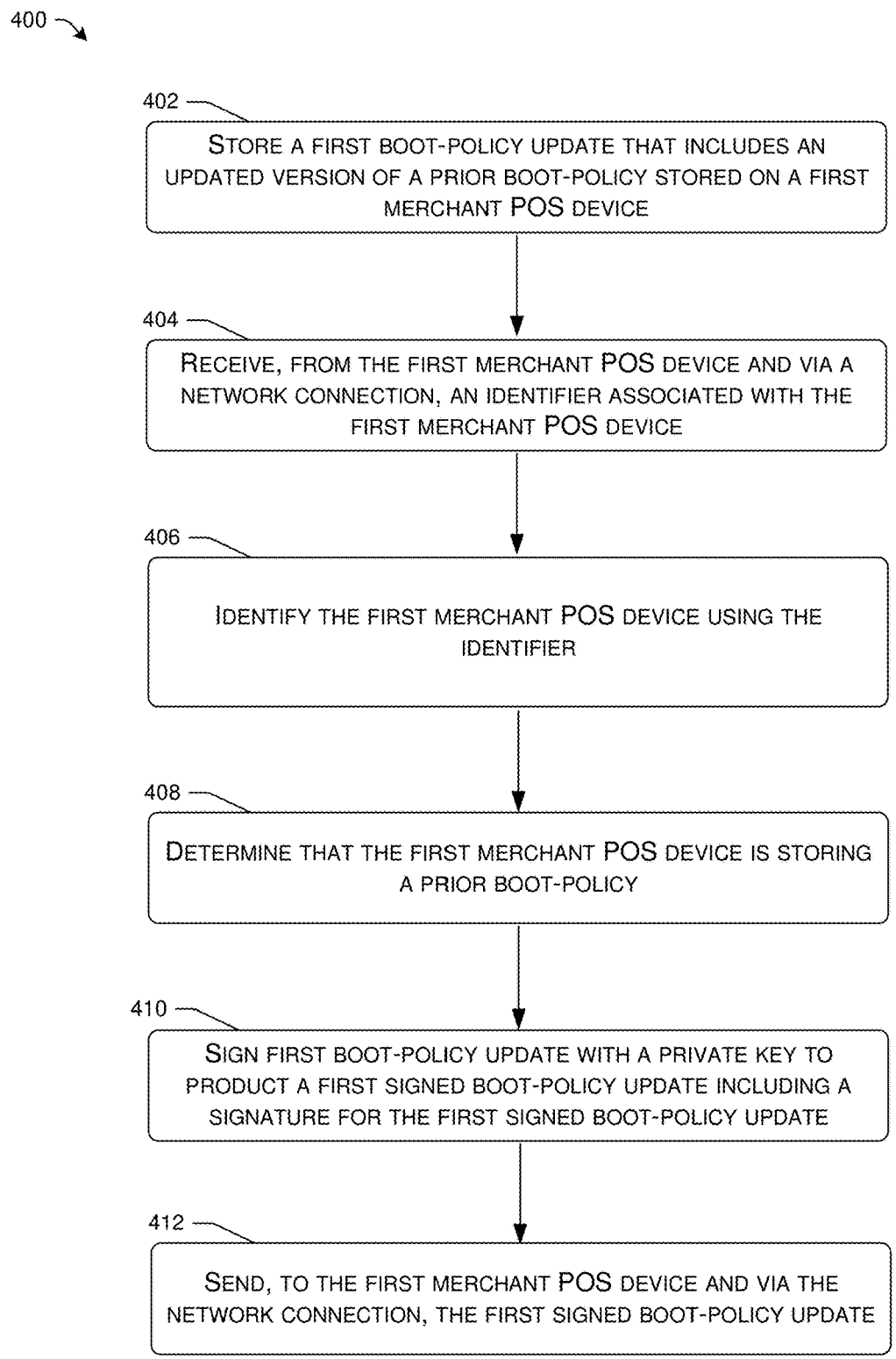
FIG. 4 illustrates a flow diagram of an example process for a payment service providing signed boot policies to a merchant device.

FIG. 4 illustrates a flow diagram of an example process 400 for a payment service 108 providing signed boot policies 160 to a first merchant device 112.

At 402, the payment service 108 may store a first boot-policy update that includes an updated version of a prior boot policy stored on the first merchant POS device, wherein the first boot-policy update includes an indication of one or more versions of software that the first merchant POS device is permitted to execute. In some examples, the one or more versions may indicate a minimum software version. In other examples, the one or more versions may indicate a single or multiple specific software versions, a range of software versions, a maximum software version, or any other indication of a software version that the boot-policy reader can permit their boot stage to execute. In some examples, the one or more versions may be a maximum version seen or stored on the first merchant device minus some range (e.g., 5 versions lower, 10 versions lower, etc.).

At 404, the payment service may receive, from the first merchant POS device and via a network connection, an identifier associated with the first merchant POS device. The identifier may comprise any data which identifies the first merchant POS device, such as a device serial number, a device IP address, an account number associated with a merchant, etc.

At 406, the payment service may identify the first merchant POS device using the identifier. For instance, the payment service may query indications of identifiers stored at the payment service to identify which merchant device is associated with the received identifier.

At 408, the payment service may determine that the first merchant POS device is storing the prior boot policy. For example, the payment service may receive, from the first merchant POS device, an indication of a boot-policy version currently stored at the first merchant POS device. In some examples, the payment service may query a database stored locally at the payment service to identify which boot-policy update was last sent to the first merchant POS device.

At 410, the payment service may sign the first boot-policy update with a private key to produce a first signed boot-policy update including a signature for the first signed boot-policy update, wherein the signature includes a serial number associated with the first merchant POS device. In some examples, the payment service may be the sole owner or possessor of the private key, which may ensure that devices with a corresponding public key may trust that the first signed boot-policy update was issued by the payment service.

At 412, the payment service may send, to the first merchant POS device and via the network connection, the first signed boot-policy update. In some examples, the payment service may further send a second signed boot-policy update to the first merchant POS device, which in turn is to send the second signed boot-policy update to a second merchant POS device communicatory coupled to the first merchant POS device.

Figure 5:
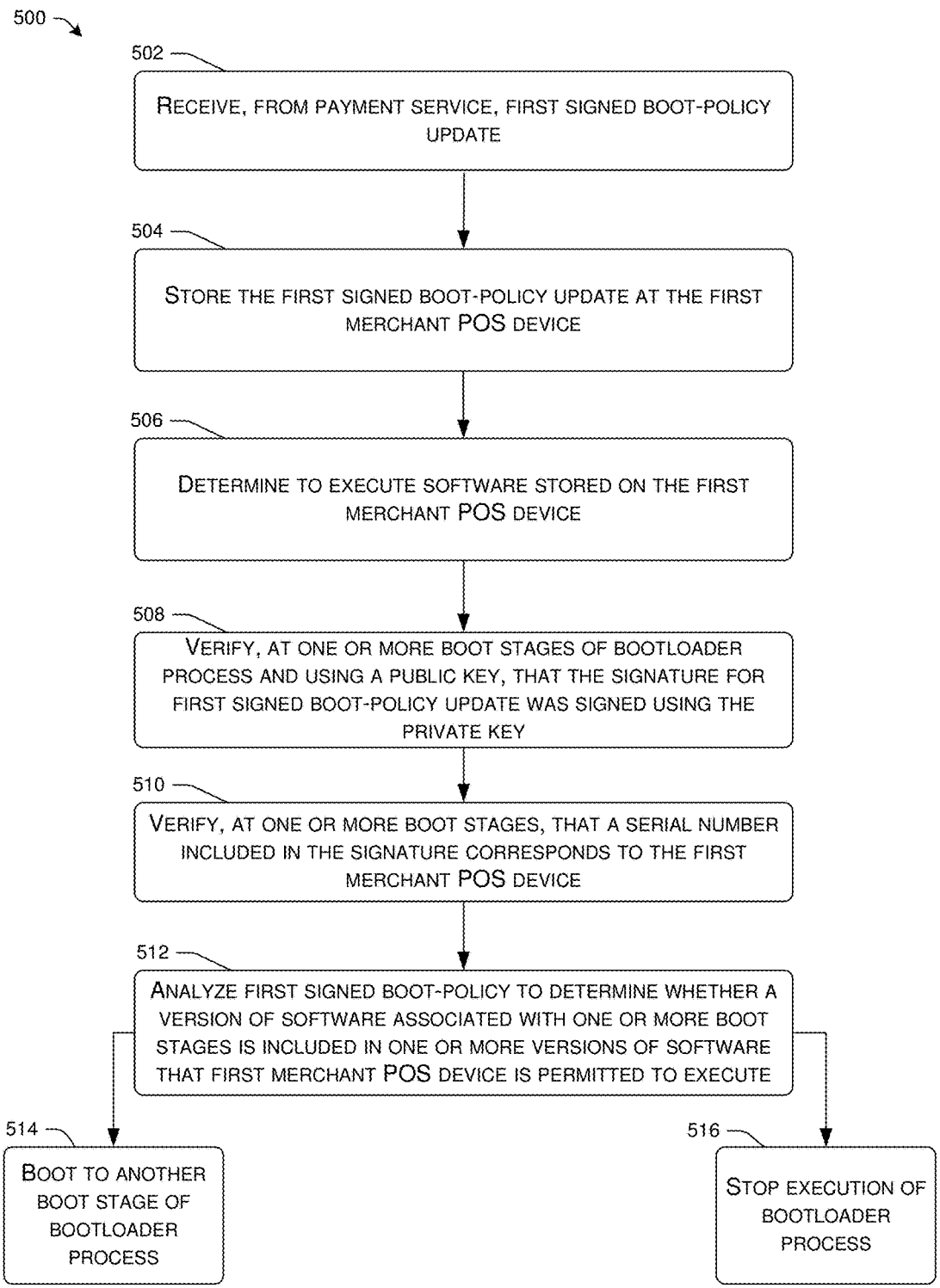
FIG. 5 illustrates a flow diagram of an example process for a merchant device executing a bootloader process according to a signed boot policy.

FIG. 5 illustrates a flow diagram of an example process 500 for a merchant device executing a bootloader process according to a signed boot policy.

At 502, the merchant device may receive, from a payment service, a first signed boot-policy update. The first signed boot-policy update may include a signature for the first signed boot-policy update, wherein the signature includes a serial number associated with the first merchant POS device.

At 504, the merchant device may store the first signed boot-policy update at the first merchant POS device. For instance, the merchant device may store the first signed boot-policy update in in non-volatile memory, such as in embedded MultiMediaCard (eMMC) memory, of the first merchant POS device.

At 506, the merchant device may determine to execute software stored on the first merchant POS device, wherein executing the software includes execution of a bootloader process. For instance, upon receiving and storing the first signed boot-policy update, components of the merchant device may force the merchant device to reboot, or force software to reboot that is executing on the first merchant device.

At 508, the merchant device may verify, at a first boot stage of the bootloader process and using a public key stored at the first merchant POS device, that the signature for the first signed boot-policy update was signed using the private key. In some examples, the verification may be performed using various encryption/decryption methods, such as asymmetrical encryption/decryption methods.

At 510, the merchant device may verify, at the first boot stage, that the serial number included in the signature corresponds to the first merchant POS device. At 520, the merchant device may analyze the first signed boot-policy update to determine whether a version of the software associated with the first boot stage is included in the one or more versions of software that the first merchant POS device is permitted to execute.

At 514, the merchant device may, based at least in part on determining that the version of the software associated with the first boot stage is included in the one or more versions of the software that the first merchant POS device is permitted to execute, boot to a second boot stage of the bootloader process.

Alternatively, at 516, the merchant device may, based at least in part on determining that the version of the software associated with the first boot stage is not included in the one or more versions of the software that the first merchant POS device is permitted to execute, stop execution of the bootloader process of the software.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
a payment service configured to communicate with a first merchant point-of-sale (POS) device, the payment service comprising:
one or more first processors; and
one or more first computer-readable media storing first computer-readable instructions that, when executed by the one or more first processors, cause the one or more first processors to perform first acts comprising:
storing a first boot-policy update that includes an updated version of a prior boot policy stored on the first merchant POS device, wherein the first boot-policy update includes an indication of one or more versions of software that the first merchant POS device is permitted to execute;
receiving, from the first merchant POS device and via a network connection, an identifier associated with the first merchant POS device;
identifying the first merchant POS device using the identifier;
determining that the first merchant POS device is storing the prior boot policy;
signing the first boot-policy update with a private key to produce a first signed boot-policy update including a signature for the first signed boot-policy update, wherein the signature includes a serial number associated with the first merchant POS device; and sending, to the first merchant POS device and via the network connection, the first signed boot-policy update; and the first merchant POS device comprising:
one or more second processors; and
one or more second computer-readable media storing second computer-readable instructions that, when executed by the one or more second processors, cause the one or more second processors to perform second acts comprising:

receiving, from the payment service, the first signed boot-policy update;

storing the first signed boot-policy update at the first merchant POS device;

determining to execute a first version of software stored on the first merchant POS device, wherein executing the first version of the software includes execution of a bootloader process;

verifying, at a first boot stage of the bootloader process and using a public key stored at the first merchant POS device, that the signature for the first signed boot-policy update corresponds to the private key;

verifying, at the first boot stage, that the serial number included in the signature corresponds to the first merchant POS device;

analyzing, at the first boot stage, the first signed boot-policy update to determine whether the first version of the software is one of the one or more versions of software that the first merchant POS device is permitted to execute;

based at least in part on determining that the first version of the software is one of the one or more versions of the software that the first merchant POS device is permitted to execute, booting to a second boot stage of the bootloader process; and based at least in part on determining that the first version of the software is not one of the one or more versions of the software that the first merchant POS device is permitted to execute, stopping execution of the bootloader process of the software in order to prevent rollback of the one or more versions of the software executing on the first merchant POS device.

2. The system of claim 1, wherein the first merchant POS device is configured to communicate with a second merchant POS device via a physical connection, and wherein the second acts of the first merchant POS device further comprise:

receiving, from the payment service, a second signed boot-policy update, wherein the second signed boot-policy update is different than the first signed boot-policy update; and sending, to the second merchant POS device, the second signed boot-policy update; and the system further comprises the second merchant POS device, the second merchant POS device comprising:
one or more third processors; and
one or more third computer-readable media storing third computer-readable instructions that, when executed by the one or more third processors, cause the one or more third processors to perform third acts comprising:

receiving, from the first merchant POS device and via the physical connection, the second signed boot-policy update;

storing the second signed boot-policy update at the second merchant POS device;

determining to execute other software stored on the second merchant POS device, wherein executing the other software includes execution of another bootloader process;

verifying, at a first boot stage of the other bootloader process and using another public key stored at the second merchant POS device, that another signature of the second signed boot-policy update corresponds to the private key;

analyzing the second signed boot-policy update to determine whether a version of the other software is one of the one or more other versions of software that the second merchant POS device is permitted to execute;

based at least in part on determining that the version of the other software is one of the one or more other versions of the other software that the second merchant POS device is permitted to execute, booting to a second boot stage of the other bootloader process; and based at least in part on determining that the version of the other software is not one of the one or more other versions of the other software that the second merchant POS device is permitted to execute, stopping execution of the other bootloader process of the other software.

3. The system of claim 1, wherein the first version of the software is one of the one or more versions of the software that the first merchant POS device is permitted to execute, and wherein the second acts further comprise:

verifying, at the second boot stage of the bootloader process and using another public key stored at the first merchant POS device, that the signature for the first signed boot-policy update corresponds to the private key;

verifying, at the second boot stage, that the serial number included in the signature corresponds to the first merchant POS device;

analyzing, at the second boot stage, the first signed boot-policy update to determine whether the first version of the software is one of the one or more versions of software that the first merchant POS device is permitted to execute;

based at least in part on determining that the first version of the software is one of the one or more versions of the software that the first merchant POS device is permitted to execute at the second boot stage, booting to a third boot stage of the bootloader process; and based at least in part on determining that the first version of the software is not one of the one or more versions of the software that the first merchant POS device is permitted to execute at the second boot stage, stopping execution of the bootloader process of the software.

4. The system of claim 1, wherein the indication of the one or more versions of software that the first merchant POS device is permitted to execute in the first signed boot-policy update defines a minimum version of software that the first merchant POS device is permitted to execute, the second acts further comprising:
determining that the first version of the software is higher than or equal to the minimum version of software that the first merchant POS device is permitted to execute; and
based at least in part on determining the first version of the software is higher than or equal to the minimum version of software that the first merchant POS device is permitted to execute, booting to the second boot stage of the other bootloader process.

5. A computing device comprising:
one or more processors; and
one or more computer-readable media storing instructions that, when executed by the one or more processors, cause the one or more processors to perform operations comprising:
receiving, via one or more network connections of the computing device, a first signed boot policy from a network-based service, wherein the first signed boot policy is associated with a private key;
storing the first signed boot policy at the computing device, wherein the first signed boot policy indicates one or more versions of software that the computing device is permitted to execute;
determining to execute a first version of software stored on the computing device, wherein executing the first version of the software includes execution of a bootloader process;
verifying, at a first boot stage of the bootloader process and using one or more public keys stored at the computing device, that a signature for the first signed boot policy corresponds to the private key;
determining, at the first boot stage of the bootloader process, whether the first version of the software is one of the one or more versions of software that the first signed boot policy indicates the computing device is permitted to execute;
based at least in part on determining that the first version of the software is one of the one or more versions of the software that the first signed boot policy indicates the computing device is permitted to execute, booting to a second boot stage of the bootloader process; and
based at least in part on determining that the first version of the software is not one of the one or more versions of the software that the first signed boot policy indicates the computing device is permitted to execute, stopping execution of the bootloader process.

6. The computing device of claim 5, wherein the signature of the first signed boot policy includes an indication of a computing device identifier, and wherein the operations further comprise:
verifying, at least partly at the first boot stage of the bootloader process, that the computing device identifier corresponds to the computing device.

7. The computing device of claim 5, wherein the first version of the software is one of the one or more versions of the software that the computing device device is permitted to execute, and wherein the signature of the first signed boot policy further includes an indication of a computing device identifier, and the operations further comprise:
verifying, at least partly at the second boot stage of the bootloader process and using the one or more public keys stored at the computing device, that the signature for the first signed boot policy corresponds to the private key;
verifying, at the second boot stage, that the computing device identifier corresponds to the computing device;
analyzing, at the second boot stage, the first signed boot policy to determine that the first version of the software is one of the one or more versions of the software that the first signed boot policy indicates the computing device is permitted to execute; and
based at least in part on the first version of the software being one of the one or more versions of the software that the first signed boot policy indicates the computing device is permitted to execute at the second boot stage, booting to a third boot stage of the bootloader process.

8. The computing device of claim 5, wherein the computing device is configured to communicate with another computing device via a physical connection, and wherein the operations further comprise:
receiving, from the network-based service, a second signed boot policy corresponding to the other computing device, wherein the second signed boot policy is associated with the private key; and
sending, via the physical connection, the second signed boot policy to the other computing device.

9. The computing device of claim 5, wherein, at least partly upon completion of the bootloader process, and wherein the operations further comprise:
determining to execute an application stored on the computing device;
analyzing the first signed boot policy to determine whether the application is one of one or more applications that the first signed boot policy indicates the computing device is permitted to execute;
based at least in part on determining that the application is included the one or more applications that the first signed boot policy indicates the computing device is permitted to execute, executing the application; and
based at least in part on determining that the application is not included in the one or more applications that the first signed boot policy indicates the computing device is permitted to execute, stopping execution of the application.

10. The computing device of claim 5, the operations further comprising:
analyzing the first signed boot policy to identify an expiration date for the first signed boot policy;
determining, based at least in part on the expiration date, that the first signed boot policy has expired; and
based at least in part on determining that the first signed boot policy has expired, stopping execution of the bootloader process.

11. The computing device of claim 5, wherein determining, at the first boot stage of the bootloader process, whether the first version of the software is one of the one or more versions of software that the first signed boot policy indicates the computing device is permitted to execute comprises:
identifying a location in the first signed boot policy storing an identifier associated with the first boot stage;
identifying, using the identifier, a minimum version of software that the first boot stage is permitted to execute; and
determining that the first version of the software is greater than or equal to the minimum version of software that the first boot stage is permitted to execute.

12. The computing device of claim 5, wherein the first version of the software is one of the one or more versions of the software that the computing device is permitted to execute, and wherein the operations further comprise:
- verifying, at the second boot stage of the bootloader process and using the one or more public keys stored at the computing device, that the signature for the first signed boot policy corresponds to the private key;
- determining, at the second boot stage, that the first version of the software is one of the one or more versions of the software that the first signed boot policy indicates the computing device is permitted to execute; and
- booting to a third boot stage of the bootloader process.

13. A method for implementing one or more anti-rollback techniques, the method comprising:
- receiving, via one or more network connections of a computing device, a first signed boot policy from a network-based service, wherein the first signed boot policy is associated with a private key;
- storing the first signed boot policy at the computing device, wherein the first signed boot policy indicates one or more versions of software that the computing device is permitted to execute;
- determining to execute a first version of software stored on the computing device, wherein executing the first version of the software includes execution of a bootloader process;
- verifying, at a first boot stage of the bootloader process and using one or more public keys stored at the computing device, that a signature for the first signed boot policy corresponds to the private key;
- analyzing the first signed boot policy to determine whether the first version of the software is one of the one or more versions of software that the computing device is permitted to execute; and
- performing at least one of:
  - based at least in part on determining that the first version of the software is one of the one or more versions of the software that the computing device is permitted to execute, booting to a second boot stage of the bootloader process; or
  - based at least in part on determining that the first version of the software is not one of the one or more versions of the software that the computing device is permitted to execute, stopping execution of the bootloader process of the software.

14. The method of claim 13, wherein the signature of the first signed boot policy includes an indication of a computing device identifier, and wherein the method further comprises:
- verifying, at the first boot stage of the bootloader process, that the computing device identifier corresponds to the computing device.

15. The method of claim 13, wherein the first version of the software is one of the one or more versions of the software that the computing device is permitted to execute, and wherein the signature of the first signed boot policy includes an indication of a computing device identifier, the method further comprises:
- verifying, at the second boot stage of the bootloader process and using the one or more public keys stored at the computing device, that the signature for the first signed boot policy corresponds to the private key;
- verifying, at the second boot stage, that the computing device identifier corresponds to the computing device;
- analyzing, at the second boot stage, the first signed boot policy to determine that the first version of the software is one of the one or more versions of the software that the computing device is permitted to execute; and
- based at least in part on the first version of the software being one of the one or more versions of the software that the computing device is permitted to execute at the second boot stage, booting to a third boot stage of the bootloader process.

16. The method of claim 13, wherein the first version of the software is one of the one or more versions of the software that the computing device is permitted to execute and at least partly responsive to booting to the second boot stage of the bootloader process, the method further comprises:
- verifying, at each boot stage of the bootloader process and using one or more public keys stored at the computing device, that a signature for the first signed boot policy corresponds to the private key;
- analyzing, at each boot stage of the bootloader process, the first signed boot policy to determine that the first version of the software is one of the one or more versions of software that the computing device is permitted to execute; and
- completing execution of the bootloader process.

17. The method of claim 13, further comprising:
- receiving, at the network-based service and from the computing device, an identifier associated with the computing device;
- determining, based at least in part on the identifier, that the computing device is part of a set of computing devices;
- determining that the set of computing devices are permitted to execute the one or more versions of the software; and
- generating the first signed boot policy based at least in part on determining that the set of computing device are permitted to execute the one or more versions of the software.

18. The method of claim 13, further comprising:
- stopping execution of the bootloader process of the software based at least in part on determining that the first version of the software is not one of the one or more versions of the software that the computing device is permitted to execute;
- receiving a second signed boot policy from the network-based service, wherein the second signed boot policy is associated with the private key, and wherein the second signed boot policy indicates one or more other versions of software that the computing device is permitted to execute;
- determining to execute the first version of the software stored on the computing device;
- verifying, at the first boot stage of the bootloader process and using the one or more public keys stored at the computing device, that a signature for the second signed boot policy corresponds to the private key;
- analyzing the second signed boot policy to determine whether the first version of the software is one of the one or more other versions of software that the computing device is permitted to execute; and
- based at least in part on determining that the first version of the software is one of the one or more other versions of the software that the computing device is permitted to execute, booting to the second boot stage of the bootloader process.

19. The method of claim 13, further comprising:
- stopping execution of the bootloader process of the software based at least in part on determining that the first version of the software is not one of the one or more versions of the software that the computing device is permitted to execute;

receiving updated software corresponding to a second version of the software stored on the computing device;

storing the second version of the software at the computing device;

determining to execute the second version of the software on the computing device, wherein executing the second version of the software includes execution of another bootloader process;

analyzing, at the first boot stage of the other bootloader process, the first signed boot policy to determine that the second version of the software is one of the one or more versions of the software that the computing device is permitted to execute; and booting to the second boot stage of the bootloader process.

20. The method of claim 13, further comprising:

analyzing the first signed boot policy to identify an expiration date for the first signed boot policy;

determining, based at least in part on the expiration date, that the first signed boot policy has expired; and based at least in part on determining that the first signed boot policy has expired, stopping execution of the bootloader process.

* * * * *